United States Patent
Yasuda et al.

(10) Patent No.: US 10,766,405 B2
(45) Date of Patent: Sep. 8, 2020

(54) SEMICONDUCTOR DEVICE AND MESSAGE IMAGE OUTPUT METHOD

(71) Applicant: RENESAS ELECTRONICS CORPORATION, Tokyo (JP)

(72) Inventors: Koji Yasuda, Tokyo (JP); Hirofumi Kawaguchi, Tokyo (JP); Akihide Takahashi, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/435,067

(22) Filed: Jun. 7, 2019

(65) Prior Publication Data
US 2019/0389368 A1 Dec. 26, 2019

(30) Foreign Application Priority Data

Jun. 21, 2018 (JP) .................. 2018-118025

(51) Int. Cl.
*B60Q 1/34* (2006.01)
*B25J 19/06* (2006.01)
(Continued)

(52) U.S. Cl.
CPC .............. *B60Q 1/346* (2013.01); *B25J 19/06* (2013.01); *B60Q 1/50* (2013.01); *G09G 5/38* (2013.01); *B60Q 2400/20* (2013.01); *B60Q 2400/50* (2013.01); *B62J 6/05* (2020.02); *B62J 6/057* (2020.02); *G09G 2380/10* (2013.01)

(58) Field of Classification Search
CPC ...... B60Q 1/346; B60Q 1/50; B60Q 2400/20; B60Q 2400/50; B62J 6/05; B62J 6/057
See application file for complete search history.

(56) References Cited

U.S. PATENT DOCUMENTS

| 2018/0004020 A1 | 1/2018 | Kunii et al. |
| 2019/0139286 A1 | 5/2019 | Shimoda et al. |

FOREIGN PATENT DOCUMENTS

| GB | 2517790 A | 3/2015 |
| WO | 2016/114048 A1 | 7/2016 |
| WO | 2018/042898 A1 | 3/2018 |

OTHER PUBLICATIONS

S. Rizvi et al., "Road safety enhancement: an investigation on the visibility of on-road image projections using DMD-based pixel light systems", Proceedings of SPIE, vol. 10554, Feb. 14, 2018.
(Continued)

*Primary Examiner* — Omeed Alizada
(74) *Attorney, Agent, or Firm* — McDermott Will & Emery LLP

(57) ABSTRACT

To provide a semiconductor device which suppresses a message image projected by a mobile from varying from a desired position. A semiconductor device has a first area decision part which decides a first area onto which a message image is projected, based on movement information of a mobile. The semiconductor device has a delay period calculation part which calculates a delay period being a period from a first time for projecting the message image onto the first area to a second time when the message image is projectable. Also, the semiconductor device has a second area decision part which adjusts the first area, based on the delay period to decide a second area. Further, the semiconductor device has an image signal conversion part which converts a message image signal according to the second area.

20 Claims, 25 Drawing Sheets

(51) Int. Cl.
*B60Q 1/50* (2006.01)
*G09G 5/38* (2006.01)
*B62J 6/05* (2020.01)
*B62J 6/057* (2020.01)

(56) References Cited

OTHER PUBLICATIONS

Extended European Search Report issued in corresponding European Patent Application No. 19180564.7-1022, dated Nov. 14, 2019.

FIG. 9
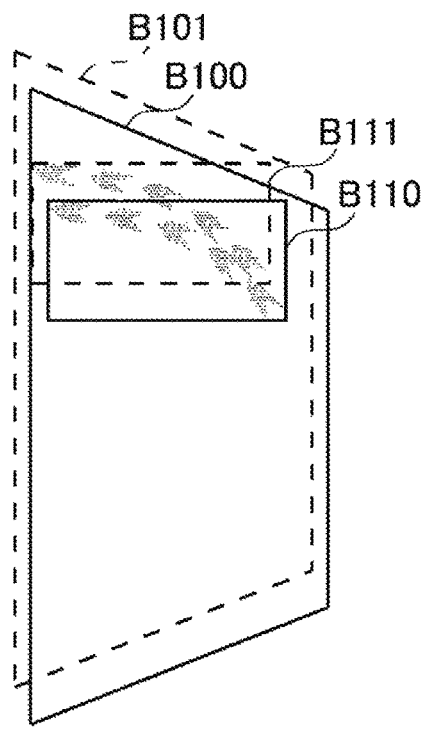
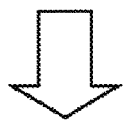
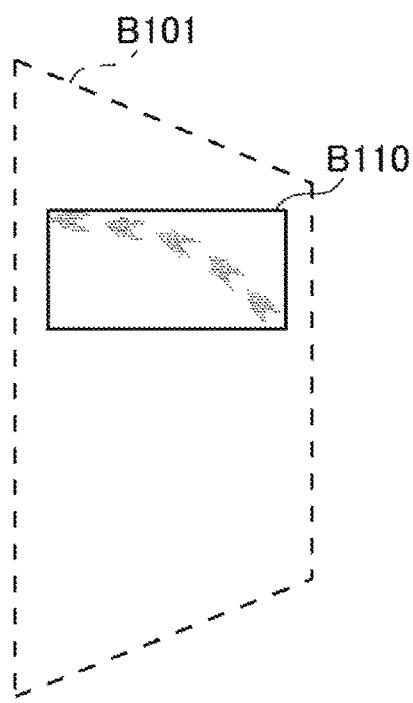

FIG. 10
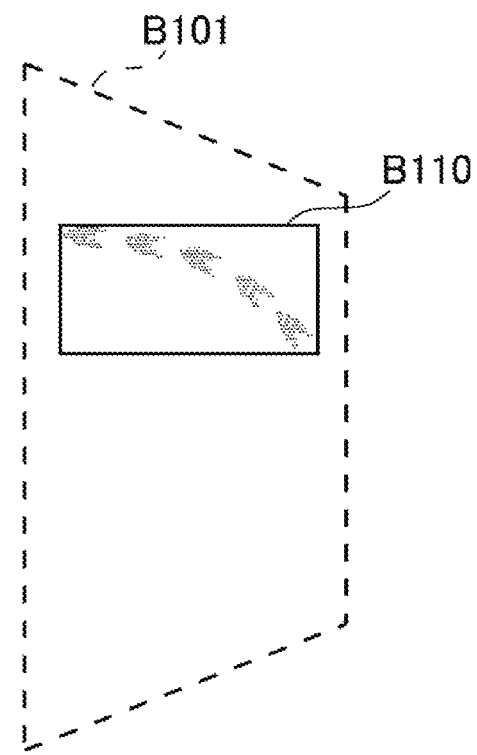
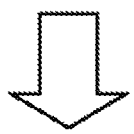
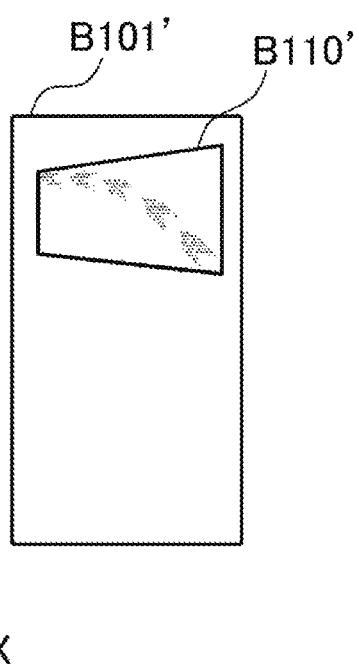

FIG. 15
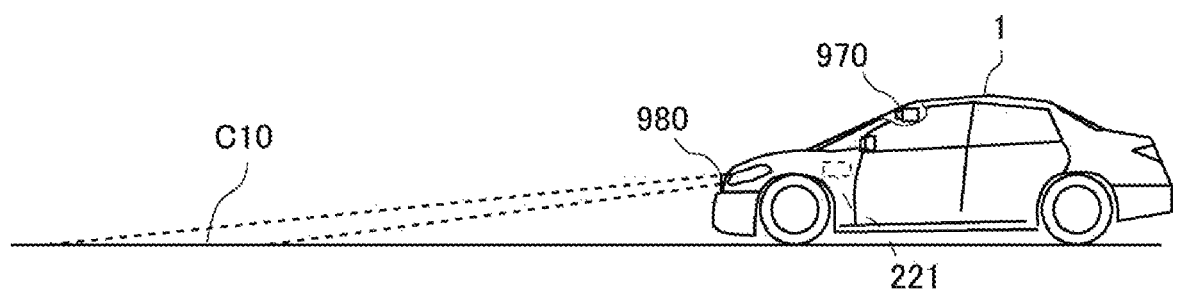
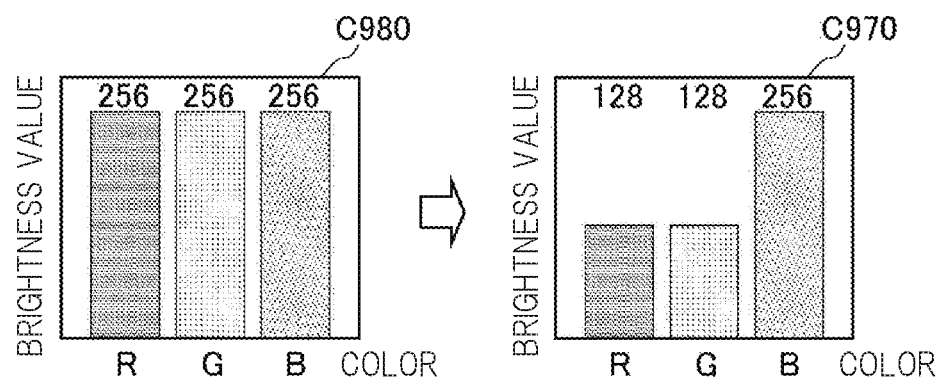

SEMICONDUCTOR DEVICE AND MESSAGE IMAGE OUTPUT METHOD

CROSS-REFERENCE TO RELATED APPLICATIONS

The disclosure of Japanese Patent Application No. 2018-118025 filed on Jun. 21, 2018 including the specification, drawings and abstract is incorporated herein by reference in its entirety.

BACKGROUND

The present invention relates to a semiconductor device, and a message image output method.

Background Art

There have been proposed various techniques of projecting light including predetermined information around a vehicle, based on information about the vehicle, etc.

For example, an image projecting device described in Patent Document 1 is equipped with an acquisition part which acquires information about a vehicle, and an image projecting part which projects an image or the like including a predetermined message or the like according to the acquired information. Further, the image projecting device appropriately switches standstill/movement of a projection position of a projection image on a road surface according to the behavior of a self-vehicle. After the vehicle stops at an intersection or the like and its advancing direction is displayed by an arrow or the like, the image projecting device applies to the display position of the arrow, correction required to grasp the position of the vehicle according to a vehicle speed pulse, the steering angle of a steering wheel, etc. and to make the arrow stay at an initial display position without linking the display position of the arrow with the movement of the vehicle.

RELATED ART DOCUMENTS

Patent Document

[Patent Document 1] International Unexamined Patent Application No. 2016/114048

SUMMARY

The following problems however arise in making the arrow projected onto the road surface stay at the initial display position by the technique described in Patent Document 1. That is, even if the position of the vehicle is grasped by the vehicle speed pulse, the steering angle of the steering wheel or the like, a delay occurs over a period from the time when a signal of an image to be projected is generated from each acquired data to the time when the generated image is projected onto the road. Since the vehicle moves even during such a delay period, a multiplication of the speed of the vehicle by the delay period results in positional displacement of the image to be projected.

Other objects and novel features will become apparent from the description of the present specification and the accompanying drawings.

According to one embodiment, there is provided a semiconductor device which outputs a message image signal being a signal of a message image to be projected onto a periphery of a mobile. The semiconductor device has a first area decision part which decides a first time being a schedule time when the message image is to be projected, and a first area being an area onto which the message image is projected, respectively. The semiconductor device has a delay period calculation part which calculates a delay period being a period from the first time for projecting the message image onto the first area to a second time when the message image is projectable. Also, the semiconductor device has a second area decision part which adjusts the first area on the basis of the movement information and the delay period to decide a second area. Further, the semiconductor device has an image signal conversion part which converts the message image signal according to the second area.

According to another embodiment, a message image output method is a message image signal output method of outputting a message image signal being a signal of a message image to be projected onto a periphery of a mobile. The message image output method includes a step of deciding based on movement information of the mobile, a first time being a schedule time when the message image is to be projected, and a first area being an area onto which the message image is projected, respectively. The message image output method has a step of calculating a delay period being a period from the first time when the message image is projected onto the first area to a second time when the message image is projectable. The message image output method has a step of adjusting the first area on the basis of the movement information and the delay period to decide a second area, a step of converting the message image signal according to the second area.

According to one embodiment, there can be provided a semiconductor device which suppresses a message image projected by a mobile from varying out of a desired position.

BRIEF DESCRIPTION OF THE DRAWINGS

FIG. 9 is a diagram for describing processing conducted by a second area decision circuit 135;

FIG. 10 is a diagram for describing image signal conversion processing conducted by a semiconductor device according to the embodiment 1;

FIG. 15 is a diagram for describing a comparison of a brightness value between a reference image signal and a test image signal;

DETAILED DESCRIPTION

Figure 1:
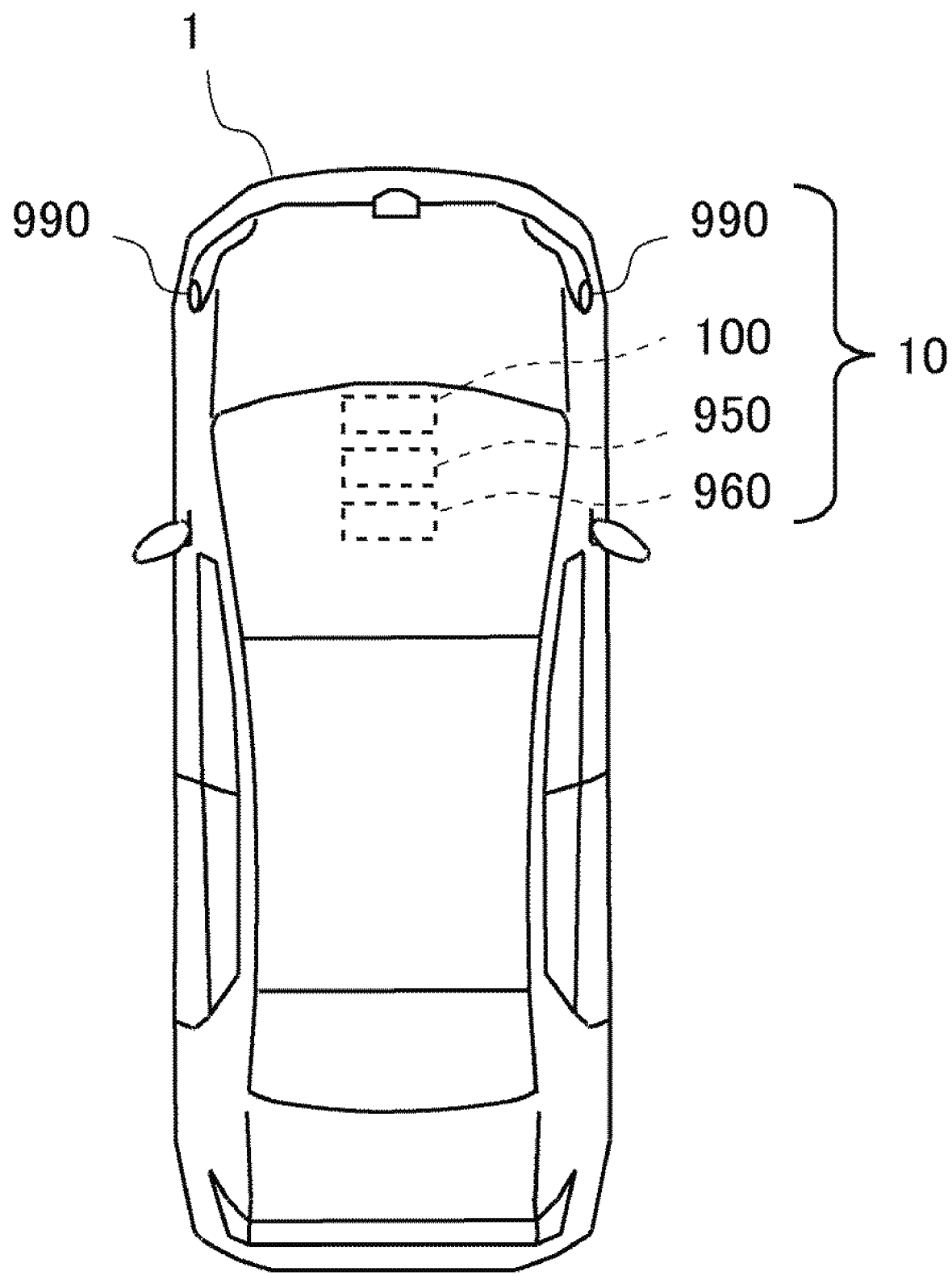
FIG. 1 is a schematic diagram of a message image projecting system according to an embodiment 1.

For clarity of explanation, the following description and drawings have been appropriately omitted and simplified. Further, the respective elements described in the drawings as functional blocks which perform various processing can be configured by CPUs (Central Processing Units), memories or other circuits in terms of hardware, and are realized by programs loaded in memories, or the like in terms of software. Accordingly, it will be understood by those skilled in the art that these functional blocks can be realized in various forms by only hardware, only software or combination thereof. They are not limited to any of them. Accordingly, in the following description, a configuration exemplified as a circuit can be achieved by either hardware or software or both thereof. A configuration shown as a circuit to achieve a certain function can also be represented as apart of software to achieve a similar function. For example, a configuration described as a control circuit can be described as a control unit. Incidentally, in the respective drawings, the same elements are respectively denoted by the same reference numerals, and dual description will be omitted as needed.

Further, the above-described programs are stored using various types of non-transitory computer readable mediums and can be supplied to a computer. The non-transitory computer readable mediums include various types of substantial recording mediums. Examples of the non-transitory computer readable mediums include a magnetic recording medium (e.g., flexible disk, magnetic tape, hard disk drive), an optical magnetic recording medium (e.g., optical magnetic disk), a CD-ROM (Read Only Memory) CD-R, a CD-R/W, and a semiconductor memory (e.g., mask ROM, PROM (Programmable ROM), EPROM (Erasable PROM), flash ROM, RAM (Random Access Memory)). Further, the programs may be supplied to the computer by various types of transitory computer readable mediums. Examples of the transitory computer readable mediums include an electric signal, an optical signal, and an electromagnetic wave. The transitory computer readable mediums are capable of supplying programs to the computer through a wired communication path such as an electric wire and an optical fiber or the like, or a wireless communication path.

Embodiment 1

An outline of a configuration of an embodiment 1 will be described with reference to FIG. 1. FIG. 1 is a schematic diagram of a message image projecting system according to the embodiment 1. FIG. 1 is a top view of a vehicle 1. As illustrated in FIG. 1, the message image projecting system 10 is mounted in the vehicle 1. The message image projecting system 10 is a system for projecting a message image around the vehicle 1. The message image is an image for transmitting a predetermined message to a driver of the vehicle 1 and persons around the vehicle 1. The message image projecting system 10 has, as its main configuration, a semiconductor device 100, an external memory 950, an ECU (Electronic Control Unit) device 960, and a message image projecting device 990.

The semiconductor device 100, the external memory 950, and the ECU device 960 are respectively mounted at predetermined positions of the vehicle 1. The details of these will be described later. The message image projecting device 990 is a device for projecting a preset message image in the lateral direction of the vehicle 1. The message image projecting device 990 is provided on the front right side of the vehicle 1 and the front left side thereof respectively.

Figure 2:
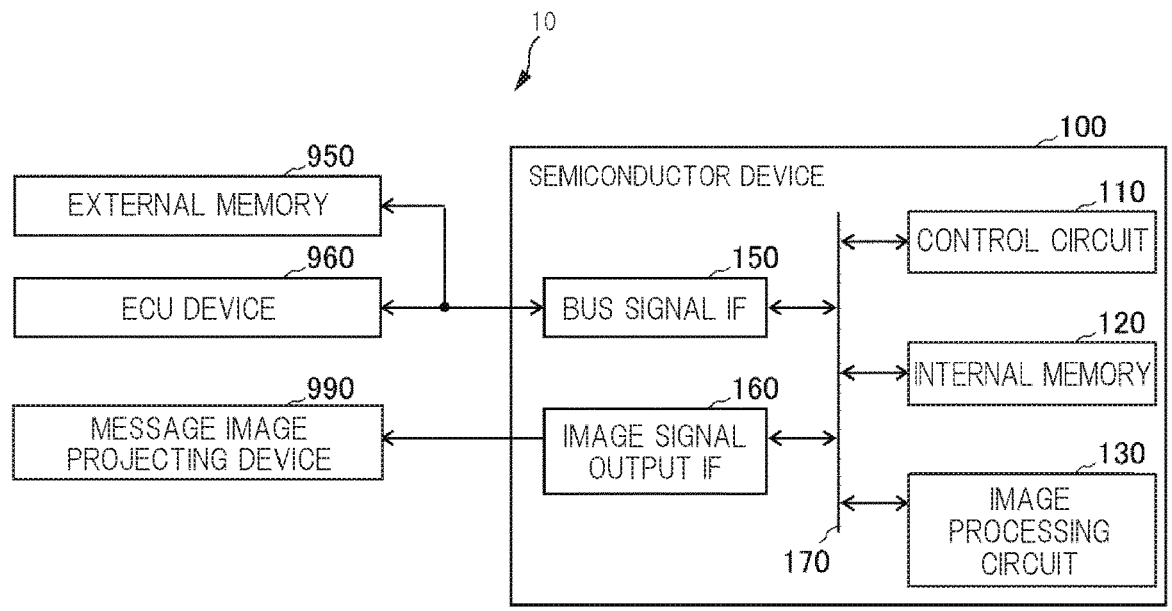
FIG. 2 is a hardware configuration diagram of the message image projecting system according to the embodiment 1.

Next, a description will be made as to functions of the respective hardware and a coupling relation therebetween in the message image projecting system 10 while referring to FIG. 2. FIG. 2 is a hardware configuration diagram of the message image projecting system according to the embodiment 1.

The semiconductor device 100 has a function of coupling to the respective configurations of the message image projecting system 10 and appropriately controlling these. The semiconductor device 100 has, as its internal configuration, a control circuit 110, an internal memory 120, an image processing circuit 130, a bus signal IF 150, and an image signal output IF 160. These are coupled so as to be communicable with each other via the bus 170.

The control circuit 110 is an operation device including a CPU, and executes a predetermined program and transmits various instructions to the respective configurations included in the semiconductor device 100.

The internal memory 120 is a memory unit which stores predetermined data therein. The internal memory 120 is configured by a nonvolatile memory like an SSD (Solid State Drive) or a flash memory, or a volatile memory like a DRAM (Dynamic Random Access Memory) or an SRAM (Static Random Access Memory), or a combination of these.

The image processing circuit 130 has a function of performing preset processing on a signal of an image received through the bus 170 and outputting the signal subjected to the processing. The details of the function of the image processing circuit 130 will be described later.

The bus signal IF 150 is an interface for allowing the semiconductor device 100 to transmit and receive various signals to and from devices outside the semiconductor device 100 through the bus 170. More specifically, the bus signal IF 150 receives a predetermined message image signal from the external memory 950 and supplies the received image signal to the image processing circuit 130 through the bus 170. Also, the bus signal IF 150 receives data regarding operation of the vehicle 1 from the ECU device and transmits the received data to the internal memory 120 or the image processing circuit 130 or the like through the bus 170. Further, the bus signal IF 150 receives a predetermined signal from the control circuit 110 and the image processing circuit 130 and supplies the received signal to the external memory 950 or the ECU device 960.

The image signal output IF 160 is an interface for supplying an image signal to the devices outside the semiconductor device 100. The image signal output IF 160 are coupled to the message image projecting device 990. The image signal output IF 160 receives an image signal from the image processing circuit 130 and supplies the received image signal to the message image projecting device 990 appropriately.

The external memory 950 is a memory unit which is coupled to the bus signal IF 150 of the semiconductor device 100 and performs transmission and reception of various signals to and from the semiconductor device 100. The external memory 950 is, for example, a nonvolatile memory unit such as a flash memory, an SSD or an HDD (Hard Disc Drive), or the like. The external memory 950 stores a predetermined message image signal therein in advance. The external memory 950 receives a request signal from the semiconductor device 100 and supplies the pre-stored message image signal to the semiconductor device 100 according to the received request signal.

The ECU device 960 is a device which manages or controls various information regarding the operation of the vehicle, such as the moving speed of the vehicle 1, the steering angle of a steering, self-vehicle position information from the GPS (Global Positioning System), etc. The ECU device 960 is coupled communicably inside the vehicle 1 by an in-vehicle communication bus such as in-vehicle Ethernet (registered trademark), a CAN (Controller Area Network), or a LIN (Local Interconnect Network) or the like. The ECU device 960 supplies movement information being information about the movement of the vehicle 1 to the bus signal IF 150 of the semiconductor device 100. The movement information includes the moving speed of the vehicle 1, the steering angle, and times at which these information are acquired. Further, the movement information may include the position information from the GPS.

The message image projecting device 990 is a projecting device for projecting a predetermined message image. The message image projecting device 990 is configured of a light source which irradiates light for projection, a display device which generates a message image to be projected, and a lens for projecting the emitted image onto a desired position, etc. The message image projecting device 990 is coupled to the image signal output IF 160 of the semiconductor device 100. The message image projecting device 990 receives a message image signal from the image signal output IF 160 and projects a message image corresponding to the received message image signal.

Figure 3:
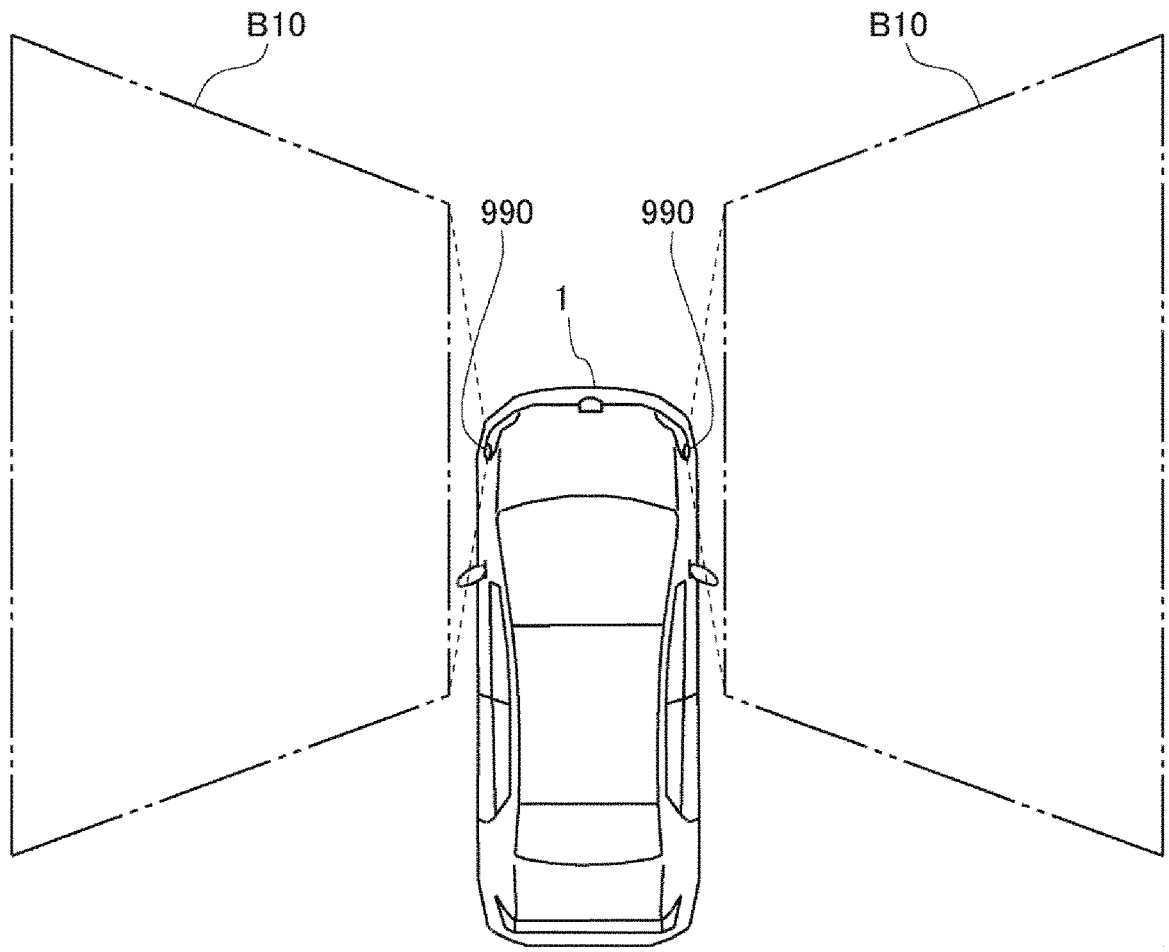
FIG. 3 is atop view of a vehicle 1, showing a projectable area of a message image projecting device according to the embodiment 1.
Figure 4:
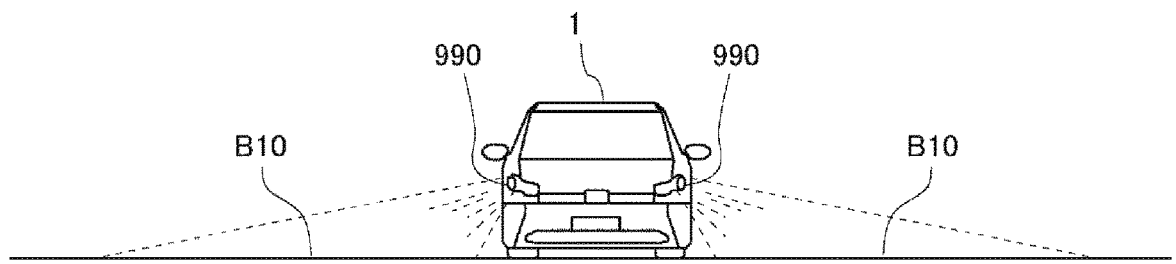
FIG. 4 is a front view of the vehicle 1, showing the projectable area of the message image projecting device according to the embodiment 1.

The message image projecting device 990 will further be described with reference to FIGS. 3 through 5. FIG. 3 is a top view of the vehicle 1, showing a projectable area of the message image projecting device according to the embodiment 1. FIG. 4 is a front view of the vehicle 1, showing the projectable area of the message image projecting device according to the embodiment 1. As shown in FIGS. 3 and 4, the message image projecting devices 990 respectively provided at the front side surfaces of the vehicle 1 respectively have projectable areas B10 at the sides of the vehicle 1. As shown in FIG. 3, when projection is made onto a road surface, the projectable area B10 assumes a trapezoid short in side on the side close to the vehicle 1 and long in side on the side far from the vehicle 1. This is because rectangular light projected from the message image projecting device 990 is projected while being diffused into a preset angle. Consequently, the light projected by the message image projecting device 990 is diffused as it becomes distant from a light source. In other words, the light projected by the message image projecting device 990 is rectangular before the projection of light, but when the light is projected onto the road surface, the light is configured to be distorted into a trapezoid having a shape set in advance. Thus, when a desired shape is projected by the message image projecting system 10, the shape of a message image is processed assuming that it is distorted into the trapezoid.

Figure 5:
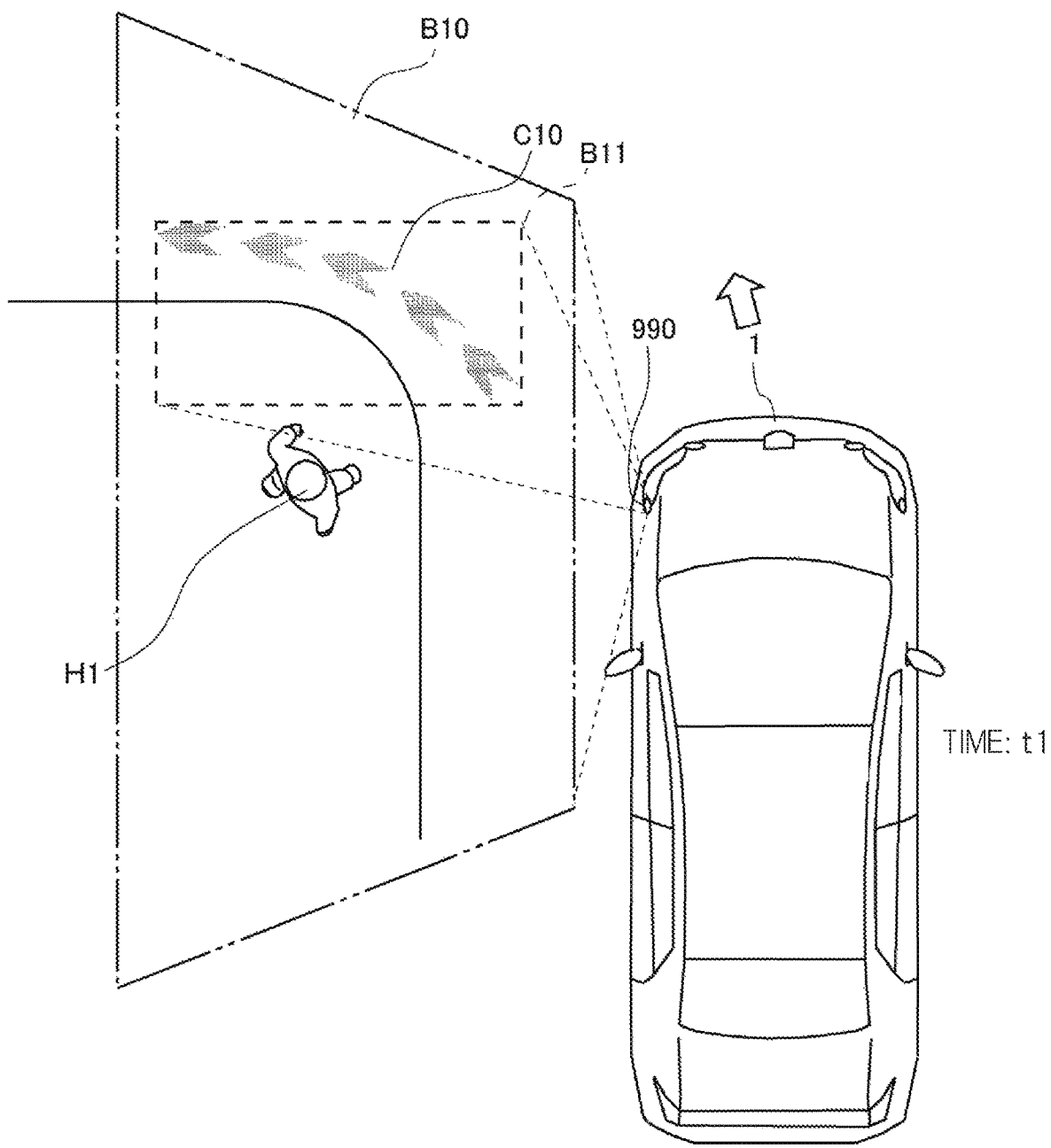
FIG. 5 is a diagram showing a state in which the vehicle 1 advances while projecting a message image onto a road surface by using the message image projecting system 10.

FIG. 5 is a diagram showing a state in which the vehicle 1 advances while projecting the message image onto the road surface using the message image projecting system 10. As shown in FIG. 5, at a time t1, the vehicle 1 tries to turn left on the road and projects a message image C10 onto the road surface to which the vehicle 1 is scheduled to advance. The message image C10 is an image for calling attention to a human being H1 who travels on the road. The message image C10 is placed within a range of the projectable area B10 of the message image projecting device 990 and further projected within a range of a message area B11. Thus, the message image projecting system 10 has a function of projecting a message image onto the road and notifying a message to pedestrians or the like.

Figure 6:
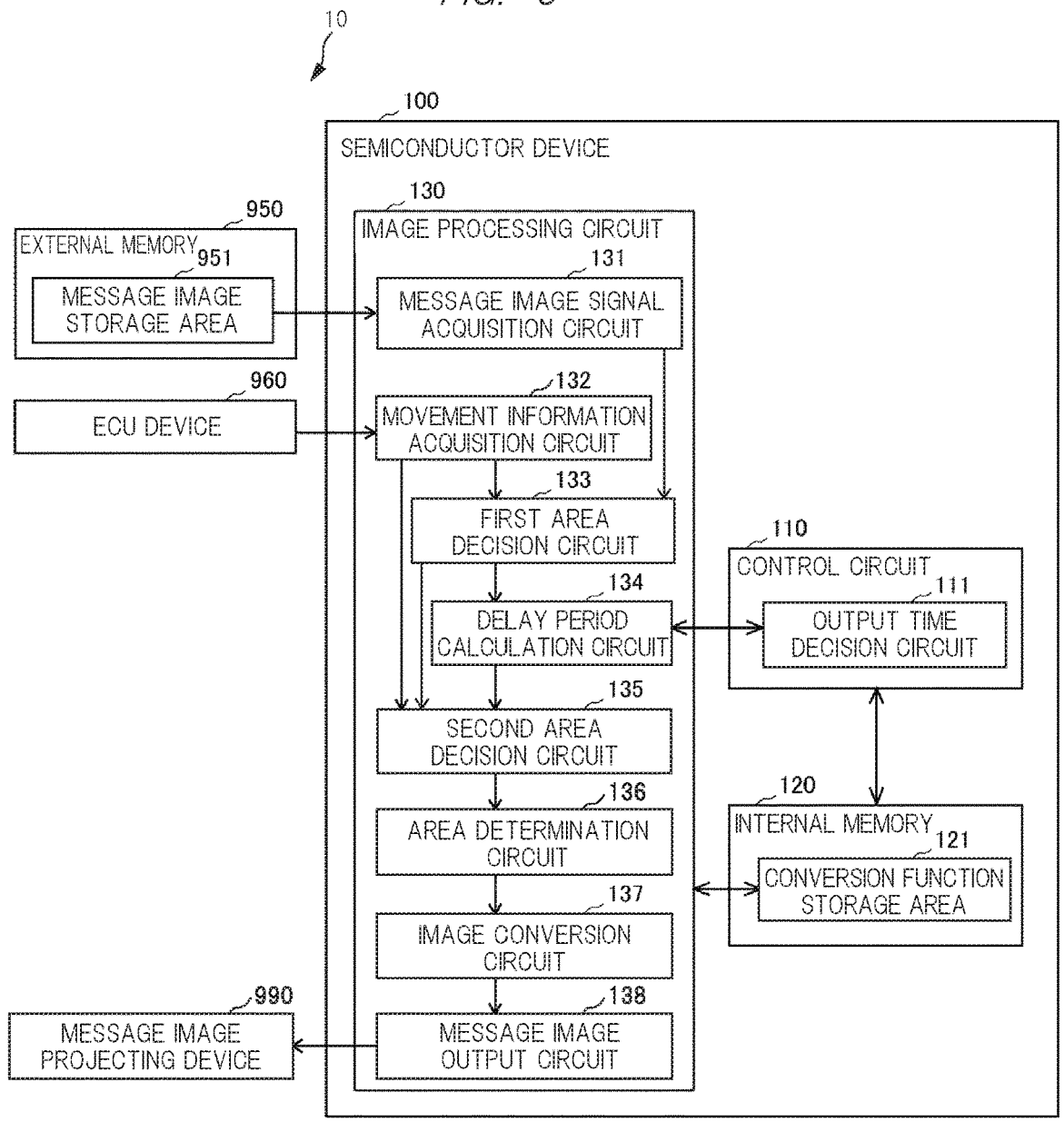
FIG. 6 is a functional block diagram of the message image projecting system according to the embodiment 1.

Next, the function of the message image projecting system 10 and the flow of each signal will further be described with reference to FIG. 6. FIG. 6 is a functional block diagram of the message image projecting system according to the embodiment 1.

The control circuit 110 has an output time decision circuit 111. The output time decision circuit 111 decides the time when a message image signal is output. The time to output the message image signal is based on a period set in advance. For example, in the case of the present embodiment, the semiconductor device 100 outputs a message image signal in a cycle of 60 Hz (for each period of 16.6 milliseconds). Thus, the output time decision circuit 111 sequentially decides the output time in such a manner that the message image signal is output in the cycle of 60 Hz. Further, the output time decision circuit 111 supplies information about the decided time to a delay period calculation circuit 134.

The internal memory 120 has a conversion function storage area 121. The conversion function storage area 121 stores therein a conversion function for performing conversion of an image signal to be described later. The conversion function may be one stored in the conversion function storage area 121 in advance or may be one read from the external memory 950 after the system is started up. The conversion function is supplied to the image processing circuit 130 in accordance with an instruction given from the control circuit 110.

The image processing circuit 130 has a message image signal acquisition circuit 131, a movement information acquisition circuit 132, a first area decision circuit 133, a delay period calculation circuit 134, a second area decision circuit 135, an area determination circuit 136, an image conversion circuit 137, and a message image output circuit 138. Each functional block included in the image processing circuit 130 will be described below.

The message image signal acquisition circuit 131 receives a message image signal being a signal of a predetermined message image from a message image storage area 951 of the external memory 950. Then, the message image signal acquisition circuit 131 supplies the received message image signal to the first area decision circuit 133.

The movement information acquisition circuit 132 receives movement information of the vehicle 1 from the ECU device 960. Further, the movement information acquisition circuit 132 supplies the received movement information to the first area decision circuit 133 and the second area decision circuit 135 respectively.

The first area decision circuit 133 decides a scheduled time to project a message image and a first area being a projection area at the scheduled time on the basis of the message image signal received from the message image signal acquisition circuit 131 and the movement information received from the movement information acquisition circuit 132. The first area decision circuit 133 supplies information about the decided scheduled time and first area to the delay period calculation circuit 134 and the second area decision circuit 135 respectively.

The delay period calculation circuit 134 calculates a delay period. The delay period is a period from a scheduled time (first time) when a message image is projected onto the first area to a time (second time) when a message image is actually projected. The delay period will further be described while referring to FIGS. 7 and 8.

Figure 7:
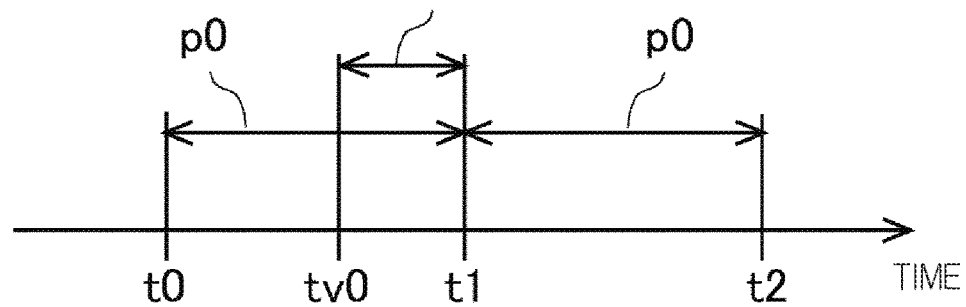
FIG. 7 is a diagram showing an example of an output timing of a message image signal and its delay period.

FIG. 7 is a diagram showing an example of an output timing of a message image signal and its delay period. FIG. 7 shows the time from a time t0 to a time t2 in a horizontal axis. The time t0, the time t1, and the time t2 respectively indicate the time when the semiconductor device 100 outputs the message image signal. The cycle (or period) during which the semiconductor device 100 outputs the message image signal is set in advance. The semiconductor device 100 outputs the message image signal in the preset cycle (or period). That is, the period from the time t0 to t1 is a period p0. Likewise, the period from the time t1 to t2 is a period p0. This will be described together with a specific example. The preset cycle (or period) for outputting the message image signal from the semiconductor device 100 is 60 Hz (16.6 milliseconds).

A time tv0 shown in FIG. 7 is a scheduled time when a message image is projected onto the first area. That is, the time tv0 is equivalent to the above-described first time. The time tv0 is determined by the first area decided by the first area decision circuit 133 and the movement information of the vehicle 1. Incidentally, the time tv0 does not coincide with the time when the semiconductor device 100 outputs the message image signal. To this end, the semiconductor device 100 outputs the message image signal at the time t1 when the message image signal is next output. Thus, when the semiconductor device 100 outputs the message image signal at the time t1, the time message image signal is output with a lag by a period from the time tv0 to t1. That is, in this case, the time t1 is equivalent to the above-described second time, and the period p1 from the time tv0 to t1 is equivalent to the above-described delay period.

Return to FIG. 6, and the description will be continued. The delay period calculation circuit 134 receives information about the scheduled time when the message image is projected onto the first area, from the first area decision circuit in order to calculate the above-described delay period. Further, the delay period calculation circuit 134 receives information about the time when the message image signal is output, from the output time decision circuit 111 of the control circuit 110. The delay period calculation circuit 134 calculates the delay period, based on these information received therein, and supplies information about the calculated delay period to the second area decision circuit 135.

The second area decision circuit 135 receives the movement information from the movement information acquisition circuit 132, the information about the scheduled time and the first area from the first area decision circuit 133, and the information about the delay period from the delay period calculation circuit 134 respectively. The second area decision circuit 135 adjusts the first area, based on these received information to decide a second area.

Figure 8:
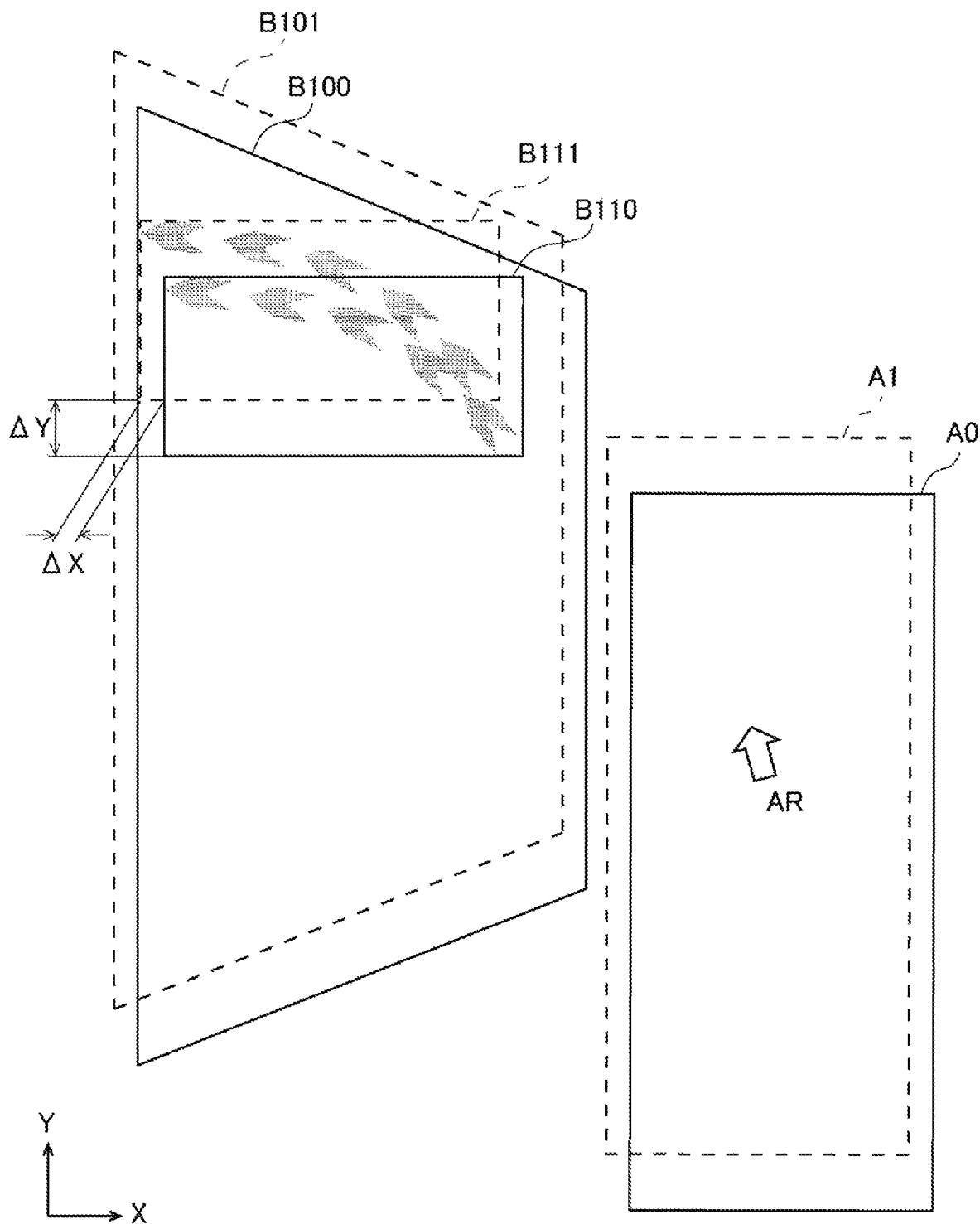
FIG. 8 is a diagram snowing the relationship between the positions of the vehicle 1 and projection areas thereof at first and second times.

A description will further be made as to the function of the second area decision circuit 135 with reference to FIG. 8. FIG. 8 is a diagram snowing the relationship between the positions of the vehicle 1 and projection areas thereof at the first and second times. An XY coordinate system for providing easy understanding is shown in FIG. 8. An X axis is set in the horizontal direction of the drawing, and an X-axis plus direction corresponds to the right direction. A Y axis is set in the vertical direction of the drawing, and a Y-axis plus direction corresponds to the upward direction.

In FIG. 8, a position of the vehicle 1 at the time tv0 (first time) is shown as a position A0 by a solid-line rectangle. Likewise, a preset projectable area at the time tv0 is shown as an area B100 by a solid-line trapezoid. A message image included in the area B100 is shown as an area B110 by a solid-line rectangle. A position of the vehicle 1 at the time t1 (second time) is shown as a position A1 by a broken-line rectangle. A preset projectable area at the time t1 is shown as an area B101 by a broken-line trapezoid. A message image included in the area B101 is shown as an area B111 by a broken-line rectangle. Further, an arrow AR shown in FIG. 8 indicates the advancing direction of the vehicle 1.

When the vehicle 1 projects the message image from the position A0 at the time tv0 as shown in FIG. 8, the message image is projected onto the area B110. However, in fact, the vehicle 1 projects the message image onto the area B111 from the position A1 at the time t1. The vehicle 1 advances in the direction (X-axis minus direction and Y-axis plus direction) of the arrow AR by the direction and speed included in the movement information between the time tv0 and the time t1. The message image is therefore projected with being shifted by ΔX in the X-axis direction and ΔY in the Y-axis direction at the time t1. Thus, the second area decision circuit 135 adjusts the first area on the basis of the delay time and the movement information of the vehicle 1.

Following the above, the processing of adjusting the first area by the second area decision circuit 135 will be described with reference to FIG. 9. FIG. 9 is a diagram for describing the processing conducted by the second area decision circuit 135. A projection area at the time tv0 (first time) and a projection area at the time t1 (second time) are shown at the upper stage of FIG. 9 in an overlapped form. The second area decision circuit 135 adjusts the position of the message image in the projection area in such a manner that the message image represented at the time t1 assumes a position where it is represented at the time tv0. The lower stage of FIG. 9 indicates the second area decided by the second area decision circuit 135. As shown at the lower stage of FIG. 9, the projectable area at the time t1 is the area B101. Then, the second area decision circuit 135 decides the position of the message image at the time t1 to assume the area B110 supposed to be projected at the time tv0. Thus, the second area decision circuit 135 calculates a projection area at an actual projection time, based on the delay period, and adjusts an image signal in such a manner that the message image is projected onto the scheduled area in the calculated projection area.

Return to FIG. 6, and the description will be continued. The second area decision circuit 135 supplies information about the second area decided as described above to the area determination circuit 136. The area determination circuit 136 receives the information about the second area from the second area decision circuit 135, and determines from the received information about the second area whether the second area is included in the projection area. Then, the area determination circuit 136 has a function of stopping the processing of outputting the message image signal where the second area is not included in the projection area. Further, when the second area is included in the projection area, the area determination circuit 136 supplies the information concerning the second area received from the second area decision circuit 135 to the image conversion circuit 137.

The image conversion circuit 137 receives the information about the second area from the area determination circuit 136 and converts the image signal on the basis of the received information. Further, the image conversion circuit 137 utilizes the conversion function stored in the conversion function storage area 121 upon converting the image signal.

The processing of the image conversion circuit 137 will be specifically described with reference to FIG. 10. FIG. 10 is a diagram for describing image signal conversion processing conducted by the semiconductor device according to the embodiment 1. A preset area B101 and an area B110 being a second area in the area B101 are shown at the upper stage of FIG. 10. An image shown at the upper stage of FIG. 10 is the same as the image shown at the lower stage of FIG. 9. An image shown at the lower stage of FIG. 10 is a message image converted by the image conversion circuit 137. An area B101' shown at the lower stage of FIG. 10 is an image projected from the message image projecting device 990 included in the message image projecting system 10. When the area B101 shown at the upper stage of FIG. 10 and the area B101' shown at the lower stage of FIG. 10 are compared with each other, B101 assumes a trapezoid, whereas B101' assumes a rectangle. Further, B101' is compressed in the X-axis direction as compared with B101.

The image conversion circuit 137 converts the projectable area in form of the trapezoid shown at the upper stage of FIG. 10 into the rectangular area B101' shown at the lower stage of FIG. 10. With this conversion, the area B110 including the message image located in the area B101 is trapezoid-converted into an area B110' having a trapezoidal shape, which includes a short side on the X-axis minus side as shown at the lower stage of FIG. 10. That is, the image conversion circuit 137 converts the image signal by using the conversion function of deciding the degree of distortion of an image according to the position in the projection area.

Returning to FIG. 6, the description will be continued. The image conversion circuit 137 performs the conversion processing of the image signal as described above and supplies the converted image signal of message image to the message image output circuit 138. When the message image output circuit 138 receives the conversion-processed message image signal from the image conversion circuit 137, the message image output circuit 138 outputs the received message image signal to the message image projecting device 990 on the basis of the time decided by the output time decision circuit 111.

Figure 11:
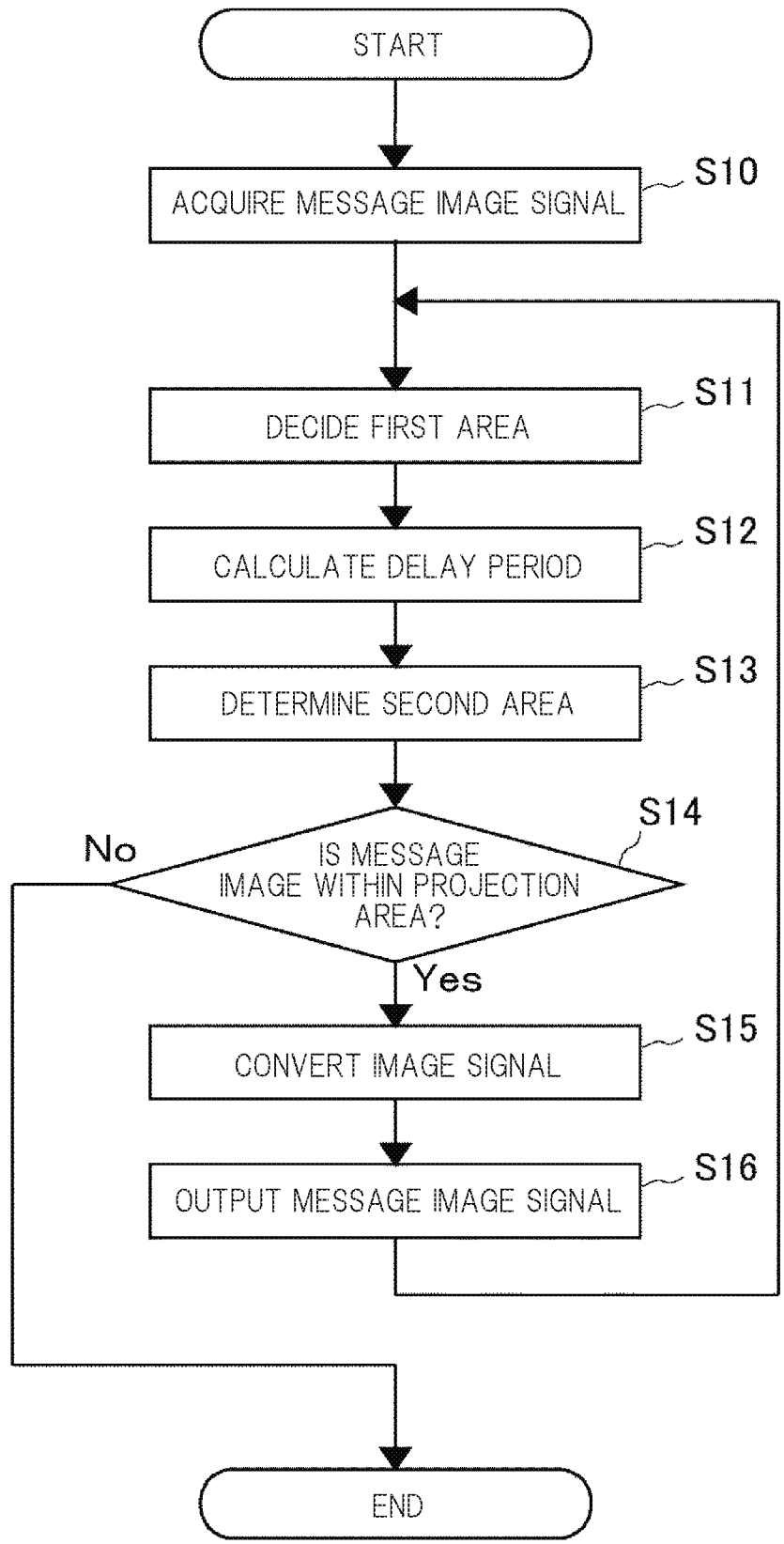
FIG. 11 is a flowchart showing processing of the message image projecting system 10 according to the embodiment 1.

A description will next be made as to processing conducted by the message image projecting system 10 with reference to FIG. 11. FIG. 11 is a flowchart showing the processing of the message image projecting system 10 according to the embodiment 1. FIG. 11 shows processing conducted by the semiconductor device 100 of the message image projecting system 10.

First, the semiconductor device 100 receives a predetermined message image from the message image storage area 951 of the external memory 950 (Step S10). Next, the semiconductor device 100 decides a first area on the basis of the movement information of the vehicle 1 (Step S11). Then, the semiconductor device 100 calculates a delay period on the basis of the movement information of the vehicle 1 and the information about the first area (Step S12). Next, the semiconductor device 100 decides a second area on the basis of the movement information of the vehicle 1, the information about the first area, and the information about the delay period (Step S13).

Next, the semiconductor device 100 determines whether the second area is within the projection area (Step S14). When it is determined that the second area is within the projection area (Step S14: Yes), the semiconductor device 100 performs image signal conversion processing (Step S15). Next, the semiconductor device 100 outputs the message image signal received from the image conversion circuit 137 (Step S16). The semiconductor device 100 outputs the message image signal, then returns to Step S11 and performs the processing of deciding the first area again.

When it is not determined in Step S14 that the second area is within the projection area (Step S14: No), the semiconductor device 100 completes the processing.

The message image projecting system 10 according to the embodiment 1 has been described above. Incidentally, the above-described first area may not need to exist in the projection area and may be located within the projection area in the second area. Thus, upon deciding the first area, the first area decision circuit 133 may adopt one wider than the projection area used in the second area decision circuit 135. By doing so, the semiconductor device 100 is capable of efficiently utilizing the inside of the projection area.

Further, the message image projecting device 990 may be made light-distributable other than being fixed. When the message image projecting device 990 is light-distributable, the message image projecting system 10 is capable of projecting the message image in a wider range. Incidentally, when the message image projecting device 990 is light-distributable, the conversion function stored in the conversion function storage area 121 may be one including a state of light distribution.

The message image projecting system 10 may have a camera which images the periphery of the vehicle 1. In that case, the movement information may be one including image information acquired by the camera. Likewise, the message image projecting system 10 may have a range sensor which measures a distance to an object around the vehicle 1. In that case, the movement information may be one including distance information of the object acquired by the range sensor.

The information about the time when the output time decision circuit 111 provides it to the image processing circuit 130 may include a processing period required until the message image projecting device 990 projects a message image signal, in addition to the time when the message image output circuit outputs a message image signal. Further, the information about the time when the output time decision circuit 111 provides it to the image processing circuit 130 may be a preset one which can further be adjusted by a user. This configuration enables a positional displacement to be accurately suppressed depending on the state of an actual system.

The information about the time when the output time decision circuit 111 provides it to the image processing circuit 130 may be one corresponding to a variable frame rate. That is, when the message image projecting device 990 has a function of varying a projection cycle of the message image projected therefrom, the output time decision circuit 111 may decide an output time according to such a function.

With the above configuration, the message image projecting system 10 is capable of projecting the message image onto the desired position even while the vehicle is being moved, and suppressing the message image from being displaced with the movement of the vehicle. It is therefore possible to project a message image easy to see for the pedestrians or the like. That is, according to the present embodiment, it is possible to provide the semiconductor device or the like which suppresses the message image projected by the mobile from varying from the desired position. Incidentally, in the above-described message image projecting system 10, the message image projecting devices 990 are provided on the front right and left sides of the vehicle 1 respectively, but are not limited thereto. That is, the message image projecting device 990 may be provided at an arbitrary position of the vehicle 1.

Embodiment 2

An embodiment 2 will next be described. A message image projecting system according to the embodiment 2 is different from that according to the embodiment 1 in that the message image projecting system projects a reference image set in advance, captures the projected reference image, and utilizes an image signal generated by capturing to thereby adjust the brightness of a message image signal.

Incidentally, the reference image is an image including a signal to be referred to for adjusting a message image signal being a signal of a message image. The reference image is, for example, white light to be projected onto a predetermined area. The message image projecting system 20 projects such a reference image and images a projected area by a camera 970.

Figure 12:
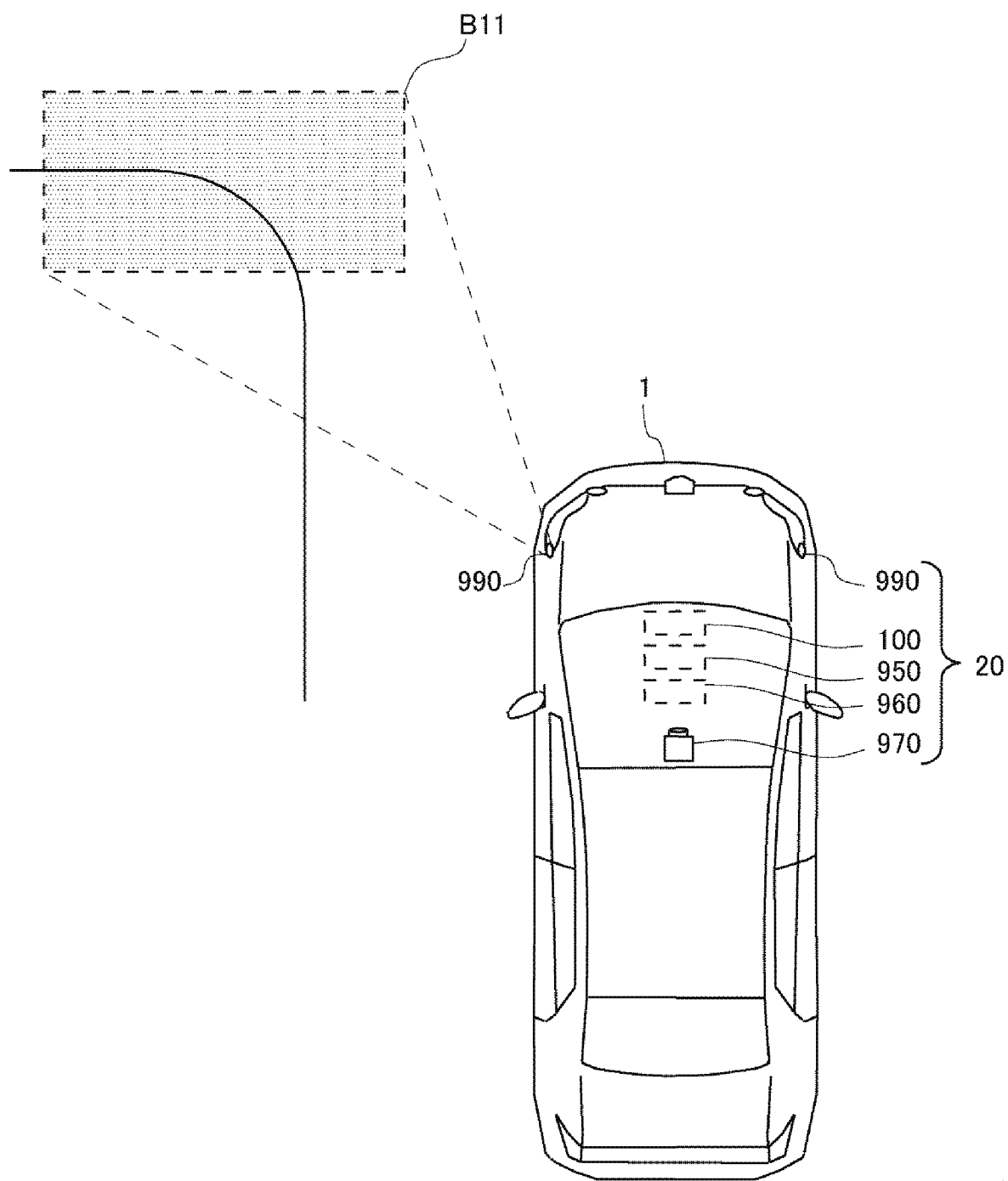
FIG. 12 is a diagram showing the outline of a message image projecting system 20 according to an embodiment 2.

A description will be made as to an outline of the message image projecting system 20 and a reference image with reference to FIG. 12. FIG. 12 is a diagram showing the outline of the message image projecting system 20 according to the embodiment 2. A vehicle 1 is equipped with the message image projecting system 20. The message image projecting system 20 is different from the message image projecting system 10 according to the embodiment 1 in that it has the camera 970. The camera 970 is capable of imaging the periphery of the vehicle 1. In FIG. 12, a message image projecting device 990 projects the reference image onto an area B11. The camera 970 captures the reference image projected onto a road surface.

Figure 13:
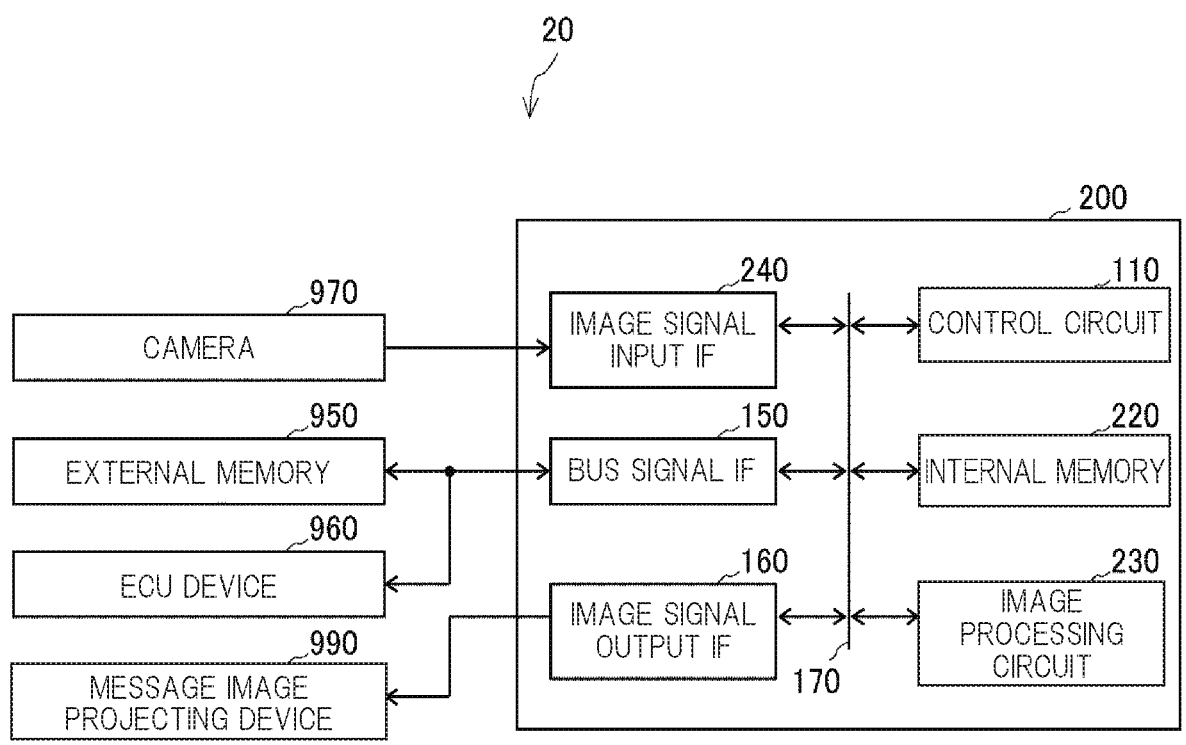
FIG. 13 is a hardware configuration diagram of the message image projecting system according to the embodiment 2.

FIG. 13 is a hardware configuration diagram of the message image projecting system according to the embodiment 2. The message image projecting system 20 has, as its main configuration, a semiconductor device 200, an external memory 950, an ECU device 960, the camera 970, and the message image projecting device 990.

The semiconductor device 200 is different from the semiconductor device 100 according to the embodiment 1 in that it receives an image signal from the camera 970. Further, the semiconductor device 200 has, as its configuration, a control circuit 110, a bus signal IF 150, an image signal output IF 160, an internal memory 220, an image processing circuit 230, and an image signal input IF 240. These are coupled to each other communicably by a bus 170. The control circuit 110, the bus signal IF 150, and the image signal output IF 160 are the same as those in the embodiment 1. The description herein will therefore be omitted. The details of the internal memory 220 and the image processing circuit 230 will be described later.

The image signal input IF 240 is an interface which receives an image signal from the outside of the semiconductor device 200. The image signal input IF 240 is coupled to the camera 970 and receives an image signal generated by the camera 970. The image signal input IF 240 supplies the received image signal to the image processing circuit 230 through the bus 170.

The camera 970 receives an instruction from the semiconductor device 200 and performs imaging according to the received instruction. The camera 970 supplies an image signal generated by imaging to the image signal input IF 240 of the semiconductor device 200.

Figure 14:
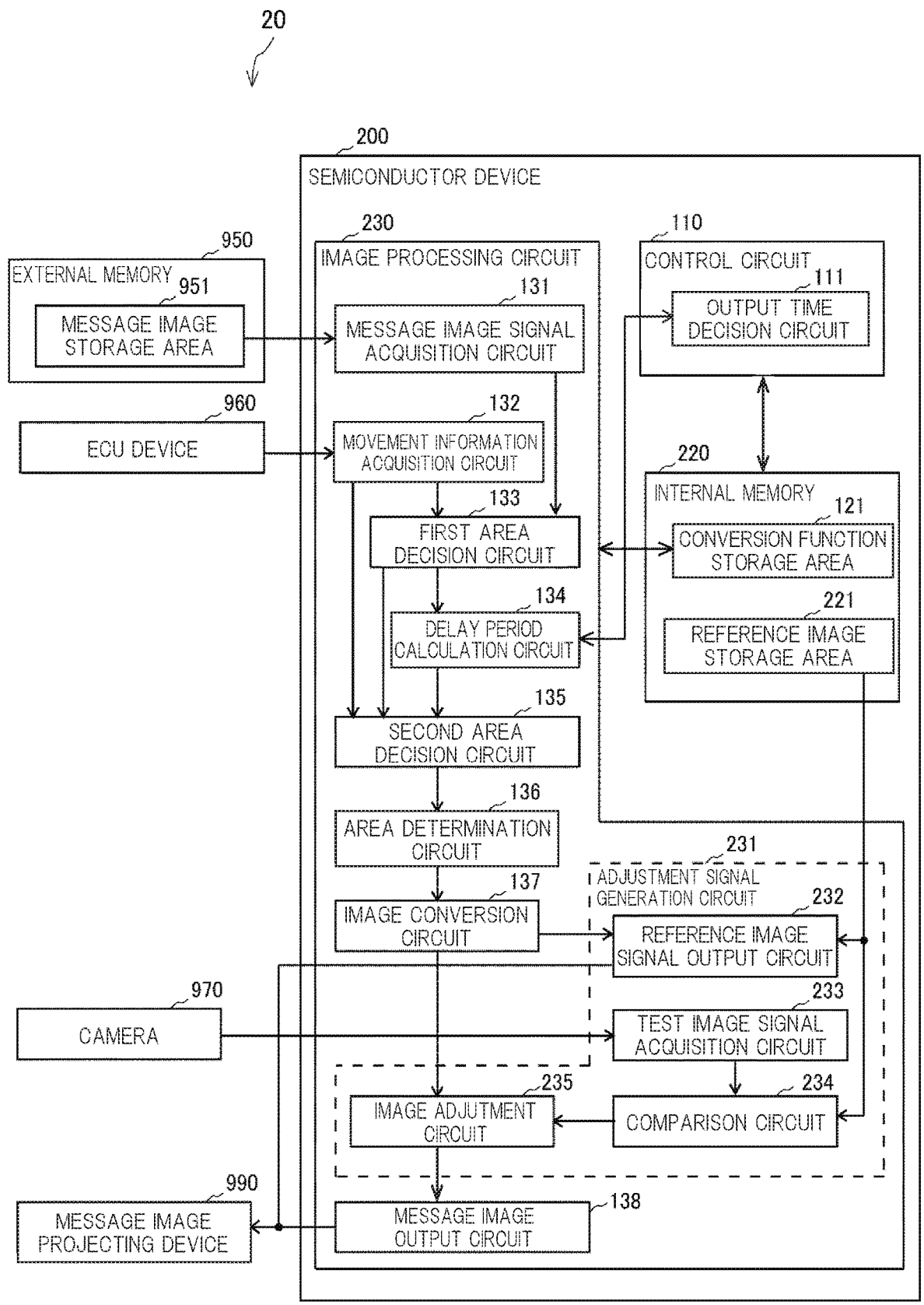
FIG. 14 is a functional block diagram of a message image projecting system according to an embodiment 3.

Next, the function of the message image projecting system 20 according to the embodiment 2 will be described with reference to FIG. 14. FIG. 14 is a functional block diagram of the message image projecting system according to the embodiment 2. The semiconductor device 200 has the internal memory 220 instead of the internal memory 120 of the semiconductor device 100. Further, the semiconductor device 200 has the image processing circuit 230 instead of the image processing circuit 130 of the semiconductor device 100.

The internal memory 220 has a reference image storage area 221. The reference image storage area 221 stores a reference image signal therein. The reference image signal may one stored in the reference image storage area 221 in advance or may be one read from the external memory 950 after starting the system. The reference image signal is supplied to the image processing circuit 230 according to an instruction from the control circuit 110.

The image processing circuit 230 is different from the image processing circuit 130 in that it has an adjustment signal generation circuit 231. The adjustment signal generation circuit 231 has a function of adjusting a message image signal according to the surface onto which a message image is projected. The adjustment signal generation circuit 231 has a reference image signal output circuit 232, a test image signal acquisition circuit 233, a comparison circuit 234, and an image adjustment circuit 235.

The reference image signal output circuit 232 receives the converted message image signal from the image conversion circuit 137. Further, the reference image signal output circuit 232 receives the reference image signal from the reference image storage area 221 of the internal memory 220. Then, the reference image signal output circuit 232 outputs the reference image signal to the message image projecting device 990 to project the reference image onto the area to project the message image. Here, the reference image signal is one obtained by converting a brightness value of the message image signal to a white color. More specifically, when the pixel value included in the message image signal is set by 8 bits (256 gradations from 1 to 256), the brightness value of each color in the reference image signal is converted into 256.

The test image signal acquisition circuit 233 bears a function of acquiring a test image signal being a signal of an image obtained by imaging the projection area on which the reference image is projected. That is, the camera 970 captures the image including the reference image as the message image projecting device 990 projects the reference image. The camera 970 supplies the test image signal being the signal of the image subjected to the capturing to the test image signal acquisition circuit 233. When the test image signal is received from the camera 970, the test image signal acquisition circuit 233 supplies the received test image signal to the comparison circuit 234.

The comparison circuit 234 bears a function of comparing between the reference image signal and the test image signal. That is, the comparison circuit 234 receives the reference image signal from the reference image storage area 221 of the internal memory 220 and receives the test image signal from the test image signal acquisition circuit 233. Here, the comparison circuit 234 compares a brightness value of each color of the reference image signal and a brightness value of each color of the test image signal.

Each brightness value to be compared may be an average value of brightness values in a predetermined area included in each image or may be a central value thereof. Further, the comparison circuit 234 may make an aspect ratio of the test image signal and an aspect ratio of the reference image signal correspond to each other and compare them for each pixel. The comparison circuit 234 supplies an adjustment signal to the image adjustment circuit 235 as a result of comparison.

The image adjustment circuit 235 receives the converted message image signal from the image conversion circuit 137 and receives the adjustment signal from the comparison circuit 234. Then, the image adjustment circuit 235 performs processing of adjusting the message image signal on the basis of the received adjustment signal. When the message image signal is adjusted, the image adjustment circuit 235 supplies the adjusted message image signal to the message image output circuit 138.

Next, a description will be made as to an example of the adjustment of the message image signal, which is conducted by the semiconductor device 200. In the present embodiment, the semiconductor device 200 adjusts the color of a message image on the basis of the reflectivity of the road surface. A comparison of a brightness value between a reference image signal and a test image signal will first be described with reference to FIG. 15. FIG. 15 is a diagram for describing the comparison of the brightness value between the reference image signal and the test image signal. The upper side of FIG. 15 shows the side surface of the vehicle 1 which projects a reference image C10 while running. The vehicle 1 projects the reference image C10 onto the road surface through the reference image projecting device 980. Then, the camera 970 captures the projected reference image C10.

A table C980 and a table C970 are shown on the lower side of FIG. 15. The table C980 is the brightness values of the reference image signal. The table C980 indicates red (R signal), green (G signal), and blue (B signal) in the horizontal axis, and indicates a brightness value in the vertical axis. That is, the reference image signal stored in the reference image storage area 221 is a white signal in which all of the R, G and B signals are 256. The message image projecting device 990 projects a white reference image C10.

The table C970 is the brightness values of the test image signal. The camera 970 captures a reference image and acquires a test image signal from the captured image. As the brightness value of each color included in the test image signal, the brightness value of the R signal is 128, the brightness value of the G signal is 128, and the brightness value of the B signal is 256. As shown in the drawing, they are not the same as those in the reference image signal. That is, the reference image projected onto the road surface is affected by reflectivity that the road surface has. In the test image signal, the brightness value of each color is decided depending on the reflectivity that the road surface has. When the example of FIG. 15 is observed for each color, the brightness value of the reference image is 256 in the R signal, but the brightness value is reduced to 128 in the test image signal. That is, the reflectivity of the R signal that the road surface has is 50% (128/256). Likewise, the reflectivity of the G signal that the road surface has is also 50%, and the reflectivity of the B signal is 100%. Thus, the semiconductor device 100 calculates the difference in brightness value between the reference image signal and the test image signal and calculates the reflectivity of the road surface from the calculated difference in brightness value.

Figure 16:
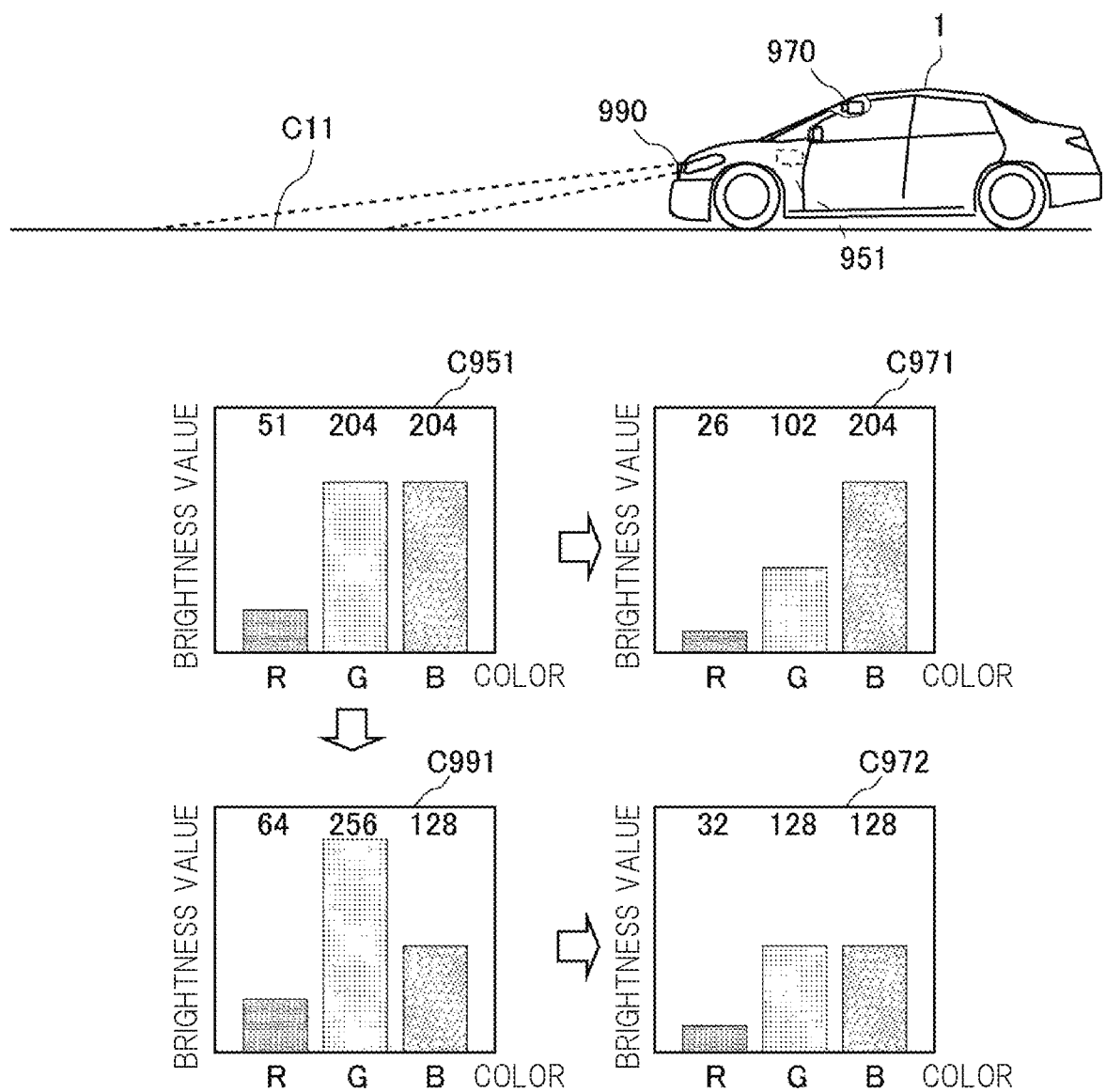
FIG. 16 is a diagram for describing the principle of adjusting a brightness value of a message image signal.

A method for adjusting the message image signal will next be described with reference to FIG. 16. FIG. 16 is a diagram for describing the principle of adjusting the brightness value of the message image signal. FIG. 16 shows on it upper side, a state in which the message image projecting device 990 of the vehicle 1 being running projects a message image. FIG. 16 shows on its lower side, a table C951, a table C991, a table C971, and a table C972 as an example of image processing to be conducted by the vehicle 1 during running. The table C951 is a brightness value of each color of the message image stored in the message image storage area 951. Here, to facilitate understanding, the message image is assumed to be a single color and to have colors that the R signal is 51, the G signal is 204, and the B signal is 204. Thus, the color of the message image is strong in green and blue and is expected to be visible to the naked eyes of a human being as a blue-green color.

When the message image is projected onto the road surface without adjusting the brightness value, the table C971 indicates the brightness value of the message image captured by the camera 970. When the message image is captured by the camera 970 after the message image is projected onto the road surface having the reflectivity shown in FIG. 15, the brightness value of each color of the message image shown in C951 becomes the brightness value of the table C971. Specifically, the brightness value of the R signal becomes 26% being 50% of 51, the brightness value of the G signal becomes 102 being 50% of 204, and the brightness value of the B signal becomes 204 being 100% of 204. That is, the color of the message image projected onto the road surface becomes weak in green and is strongly visible to the naked eyes of the human being in blue. Thus, when the brightness value of the image signal is not adjusted, the color of the message image signal is affected by the reflectivity of the road surface due to the projection of the message image onto the road surface. There is therefore a possibility that the color of the message image signal will change depending on a road surface condition.

The table C991 and the table C972 will next be described. The table C991 indicates the brightness value of each color after adjustment of the brightness value of the message image by the image adjustment circuit 235. The image adjustment circuit 235 adjusts the brightness value of the message image, based on the reflectivity of the road surface. A description will be made here as to an example in which the image adjustment circuit 235 performs adjustment for suppressing a change in the reflectivity of the road surface. The image adjustment circuit 235 multiplies the brightness value of each color of the message image by an inverse number (1/0.5=2) of the reflectivity (50%) of the road surface (R: 51×2=102, G: 204×2=408, and B: 204×1=204). Then, the values obtained by the multiplication are normalized such that the maximum becomes 256 (R: 102÷408×256≈64, G: 408÷408×256=256, and B: 204÷408×256≈128). As a result of execution of such processing, the brightness value of each color of the message image becomes 64 in the R signal, 256 in the G signal, and 128 in the B signal. The message image projecting device 990 projects the message image signal adjusted by the image adjustment circuit 235 onto the road surface.

The table C972 indicates brightness values where the message image signal adjusted by the image adjustment circuit 235 is projected onto the road surface, and the projected message image is captured by the camera 970. As shown in the table C972, the brightness value of the message image shown in C991 changes to 32 being 50% of 64 in the R signal, changes to 128 being 50% of 256 in the G signal, and becomes 128 being 100% of 128 in the B signal. Thus, though the message image shown in C972 is changed to be dark in tone as compared with the message image shown in C972, the message image is strong in green and blue and visible to the naked eyes of the human being as a blue-green color.

As described above, the semiconductor device 200 according to the embodiment 2 is capable of performing processing of adjusting the brightness value of the message image and suppressing degradation in visibility for a person who sees the message image. Incidentally, the present embodiment has shown the example in which the semiconductor device 200 adjusts the color of the message image signal. In the present embodiment, however, the object to be adjusted may be contrast of the message image signal. In this case, the semiconductor device 200 performs such adjustment as to suppress the degradation of a dynamic range of brightness of the message image signal. Further, the semiconductor device 200 may adjust the tone of the whole image. That is, the semiconductor device 200 may apply gamma correction to the message image signal. Also, the semiconductor device 200 may adjust the color saturation of the message image.

Further, the semiconductor device 200 may store in advance, an adjustment signal of an image for each typical pattern of the road surface and adjust the message image by the adjustment signal stored in advance. That is, the message image projecting system 20 stores in advance, several patterns of typical adjustment signals in the external memory or the internal memory. The typical adjustment signals are adjustment signals generated considering in advance reflectivity due to road surface conditions of concrete, asphalt or stone pavements, on on-snow, and in fine and rainy weather, etc. for example. Then, the semiconductor device 200 compares the test image signal and the reference image signal to thereby select a pattern in which the reflectivity of the road surface during the running of the vehicle is close to any of the typical adjustment signals stored in advance. Then, the semiconductor device 200 adjusts the message image by using the adjustment signal of the selected pattern. With this configuration, the message image projecting system 20 is capable of performing processing of suppressing degradation in visibility more easily and at a high processing speed.

Furthermore, the semiconductor device 200 may add processing of suppressing the brightness of the message image to be projected from being changed suddenly. For example, the semiconductor device 200 calculates an average brightness value Ave (t20) of an immediately preceding projected message image signal, calculates an average brightness value Ave (t21) of a message image signal to be projected from now, calculates a weighted average of these values, and sets a gain G of a brightness value on the basis of the calculated weighted average.

$$G = W \cdot \text{Ave}(t20) + (1-W) \cdot \text{Ave}(t21) \quad (1)$$

where W is a positive real number of 1 or less. Further, the semiconductor device 200 may adjust the brightness by a moving average instead of the weighted average. By performing such processing, the message image projecting system 20 is capable of projecting the message image suppressing degradation in visibility for the person who sees the message image and suppressing a sudden change in the brightness value.

Figure 17:
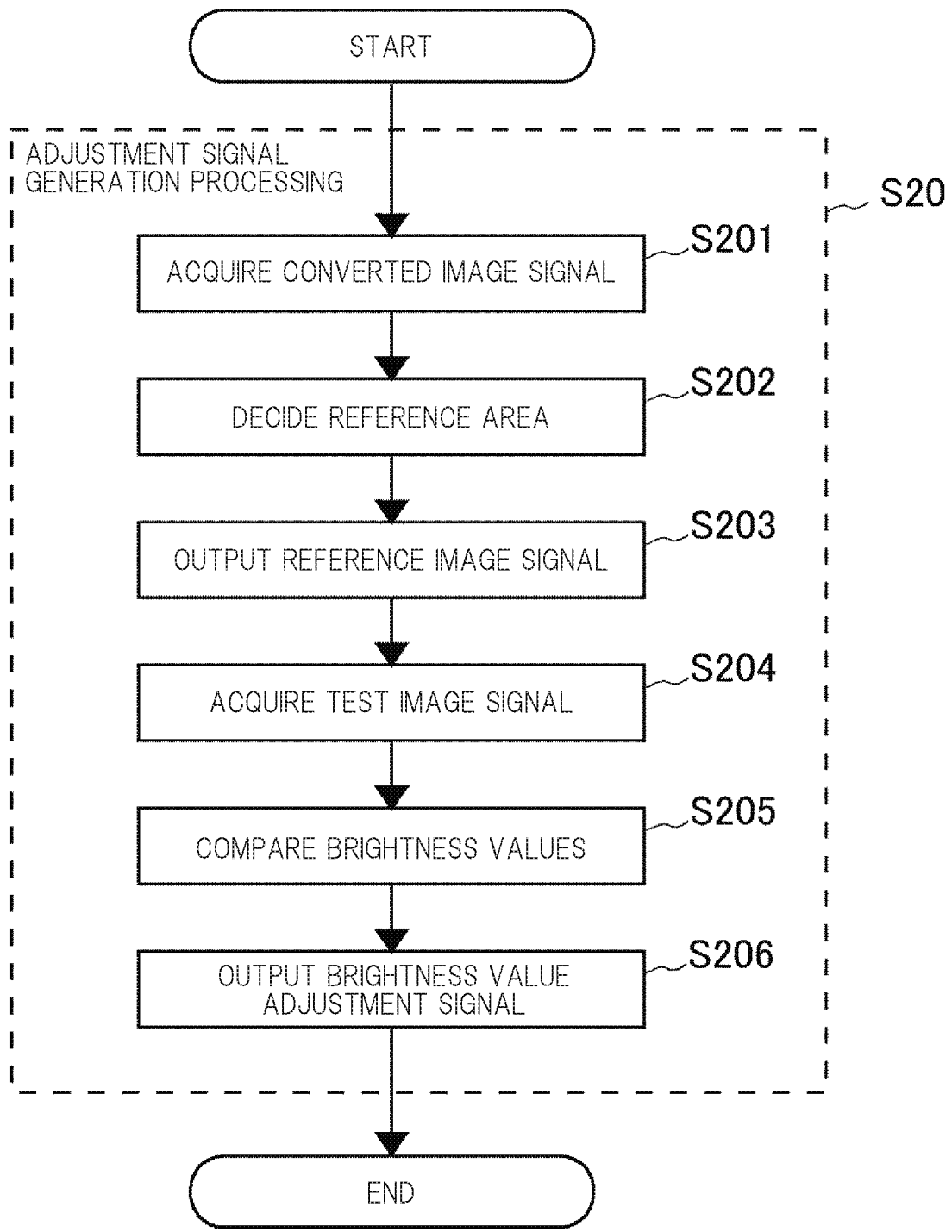
FIG. 17 is a flowchart showing processing conducted by an adjustment signal generation circuit 231 according to the embodiment 2.
Figure 18:
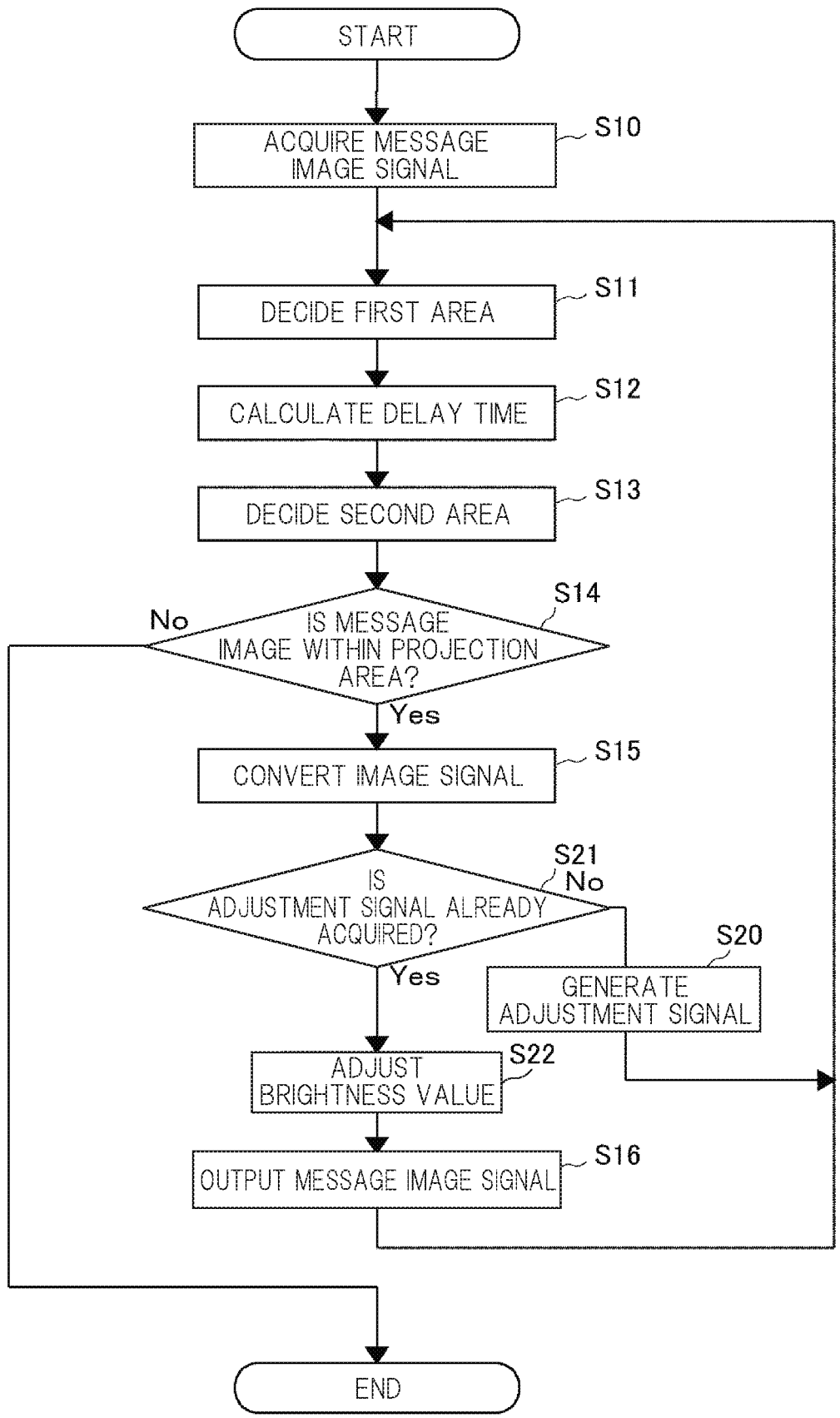
FIG. 18 is a flowchart showing processing of the message image projecting system 20 according to the embodiment 2.

A description will next be made as to the processing of the message image projecting system 20 according to the embodiment 2 with reference to FIGS. 17 and 18. FIG. 17 is a flowchart showing processing executed by the adjustment signal generation circuit 231 according to the embodiment 2. The adjustment signal generation circuit 231 acquires the converted message image signal from the image conversion circuit 137 (Step S201). Next, the adjustment signal generation circuit 231 decides a reference area (Step S202). The reference area coincides with an area onto which a message image is projected. Next, the adjustment signal generation circuit 231 generates a reference image signal and outputs the generated reference image signal to the message image projecting device 990 (Step S203). Next, the adjustment signal generation circuit 231 acquires a test image signal from the camera 970 (Step S204). Then, the adjustment signal generation circuit 231 compares brightness values of the reference image signal and the test image signal (Step S205). Next, the adjustment signal generation circuit 231 outputs an adjustment signal generated as a result of comparison between the brightness values of the reference image signal and the test image signal and supplies the same to the image adjustment circuit 235 (Step S206). The adjustment signal generation circuit 231 performs processing of Steps S201 to S206 described above. Incidentally, the processing of Steps S201 to S206 will be referred to as adjustment signal generation processing (Step S20).

Next, FIG. 18 will be described. FIG. 18 is a flowchart showing the processing of the message image projecting system 20 according to the embodiment 2. FIG. 18 shows processing conducted by the semiconductor device 200 of the message image projecting system 20. FIG. 18 is different from the processing according to the embodiment 1 described in FIG. 11 in that it includes the adjustment signal generation processing (Step S20) and the processing of adjusting the brightness value. The processing of Steps S10 to S15 is the same as that in the embodiment 1. A description will be made below as to points of difference from the processing according to the embodiment 1.

After the conversion processing (Step S15) of the message image, the semiconductor device 200 determines whether the adjustment signal is already acquired (Step S21). When it is not determined that the adjustment signal has already been acquired (Step S21: No), the semiconductor device 200 performs the adjustment signal generation processing (Step S20). The processing of Step S20 has already been described while referring to FIG. 17. When the adjustment signal generation processing is executed, the semiconductor device 200 returns to Step S11 and performs the processing (Step S11) of deciding the first area again.

On the other hand, when it is determined that the adjustment signal has already been acquired (Step S21: Yes), the semiconductor device 200 adjusts the brightness value of the message image on the basis of the acquired adjustment signal (Step S22). Next, the semiconductor device 200 outputs the message image signal adjusted in brightness value to the message image projecting device 990 (Step S16). When the message image signal is output, the semiconductor device 200 returns to Step S11 and performs the processing of deciding the first area again.

Modification of Embodiment 2

Figure 19:
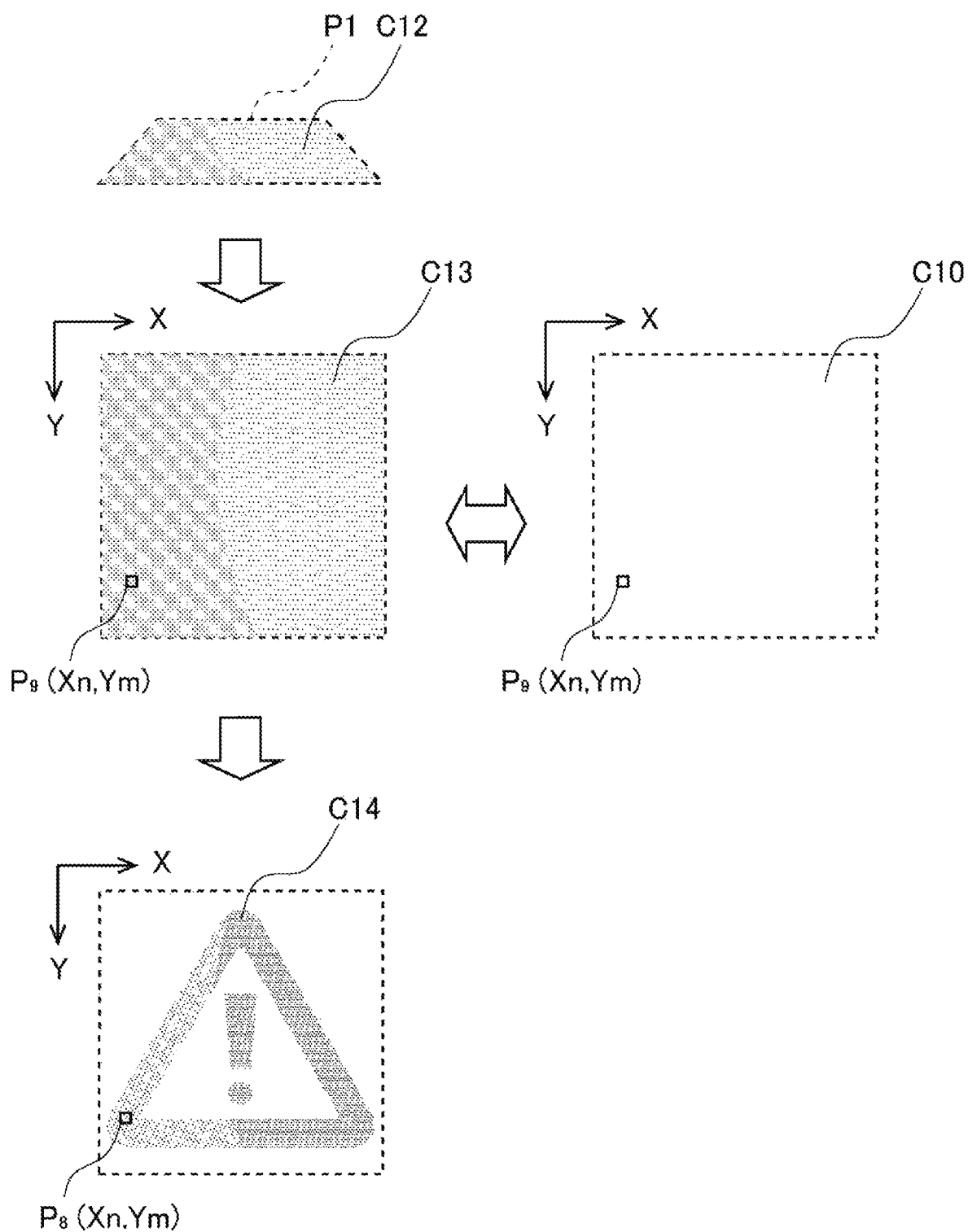
FIG. 19 is a diagram for describing a method for adjusting a message image according to a modification of the embodiment 2.

Next, a description will be made as to a modification of the embodiment 2. The present exemplification is different from the embodiment 2 in terms of the functions of the comparison circuit 234 and the image adjustment circuit 235. FIG. 19 is a diagram for describing a method for adjusting a message image according to the modification of the embodiment 2. FIG. 19 shows a reference image C10 projected onto a position P1.

In the present exemplification, a road surface onto which the reference image C10 is projected is different in reflectivity in the right and left thereof. In such a case, when the reflectivity of the reference image is set to be uniform to adjust a message image signal, there is a risk that an area hard to see partly occurs, and a message image is not correctly recognized. Thus, the comparison circuit 234 of the semiconductor device 200 in the present exemplification has a function of allowing an angle of view of a reference image and an angle of view of a test image to correspond to each other and comparing a reference image signal with a test image signal for each pixel. Further, the image adjustment circuit 235 of the semiconductor device 200 in the present exemplification has a function of allowing the angle of view of the test image and the angle of view of the message image to correspond to each other and adjusting the message image signal for each pixel of the message image signal.

The present exemplification will hereinafter be described specifically with reference to FIG. 19. The comparison circuit 234 in the present exemplification first acquires an image signal of a test image C12 obtained by capturing a projected reference image. Next, the comparison circuit 234 performs trapezoidal conversion processing on the test image C12. Thus, the angle of view of the test image C12 is processed to be the same as that of a reference image C10. An image C13 is one obtained by processing the angle of view of the test image C12 by trapezoidal conversion. Next, the comparison circuit 234 compares the reference image C10 and the image C13 for each pixel. As shown in FIG. 19, for example, the comparison circuit 234 compares brightness values in terms of a pixel $P_9$ being an nth and mth pixel as viewed in X and Y directions. Thus, the comparison circuit 234 compares the brightness values of all pixels for each pixel.

Next, the image adjustment circuit 235 adjusts the message image on the basis of a result of comparison conducted by the comparison circuit 234. A message image C14 is one adjusted based on the result of comparison conducted by the comparison circuit 234. As shown in FIG. 19, the adjusted message image C14 is adjusted in brightness for each pixel according to the reflectivity of the road surface. Thus, according to the present exemplification, it is possible to more finely suppress deterioration in the image being affected by the road surface.

With the above-described configuration, the message image projecting system 20 according to the embodiment 2 can provide the semiconductor device or the like which suppresses the message image projected by the mobile from varying from a desired position, while suppressing deterioration in the image due to being affected by the projection surface.

Embodiment 3

An embodiment 3 will next be described. In a message image projecting system according to the embodiment 3, one of two vehicles while being running serves as a transmitter of a message, whereas the other thereof serves as a receiver of a message. Then, the transmitter projects a message image for the receiver. Also, the message image projecting system has a function of stabilizing the relative position of the projected message image for the receiver and suppressing degradation in visibility.

Figure 20:
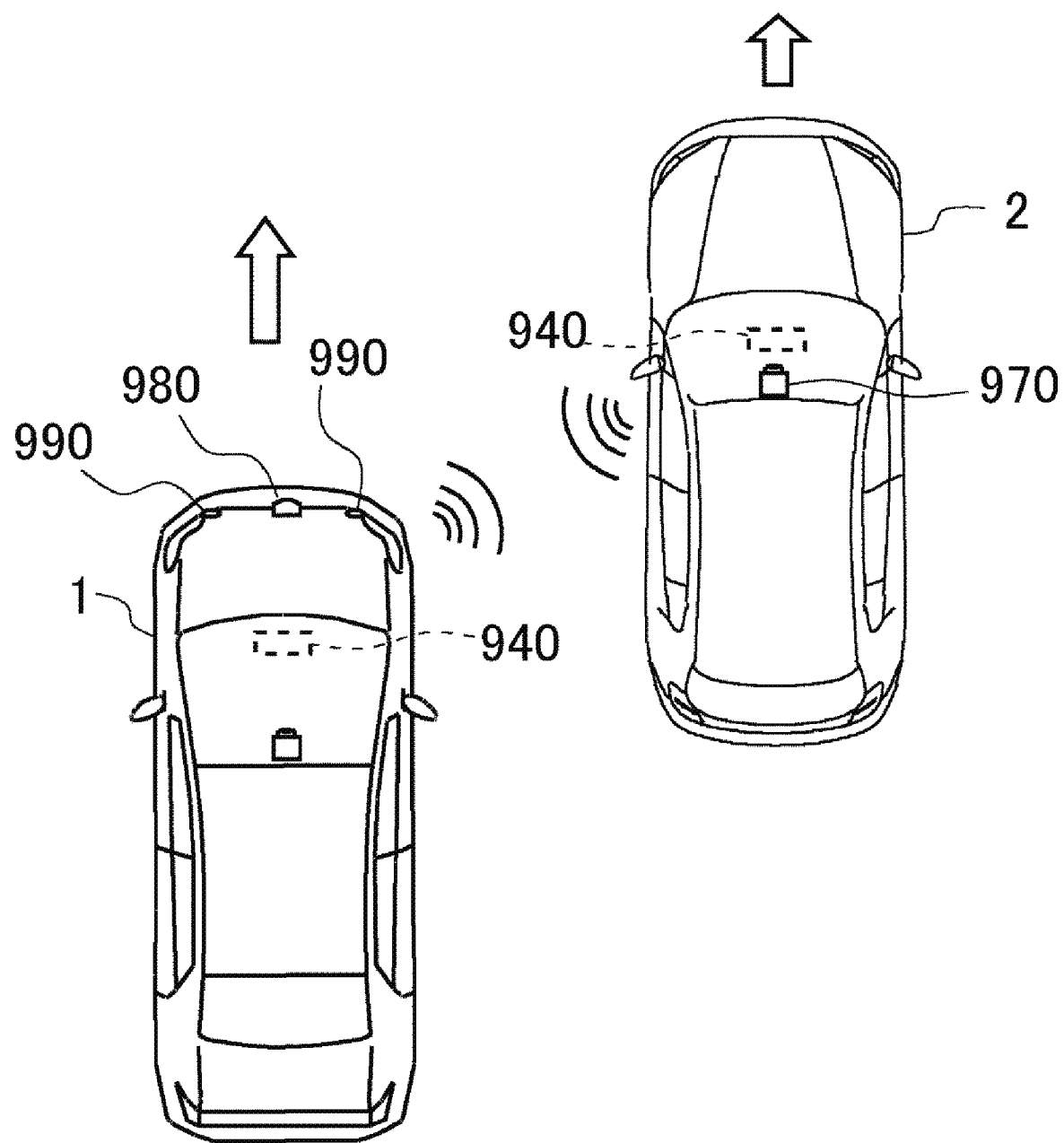
FIG. 20 is a diagram for describing a system outline of a message image projecting system 30 according to an embodiment 3.

A system outline of the message image projecting system 30 according to the embodiment 3 will be described with reference to FIG. 20. FIG. 20 is a diagram for describing the system outline of the message image projecting system 30 according to the embodiment 3. Vehicles 1 and 2 shown in FIG. 20 are respectively equipped with the message image projecting system 30. The message image projecting system 30 is different from the message image projecting system 20 according to the embodiment 2 in that it has a reference image projecting device 980. Further, the message image projecting system 30 is different from the message image projecting system 20 according to the embodiment 2 in that it has a communication device 940. The vehicle 1 and the vehicle 2 are communicable with each other by being equipped with the communication devices 940. Incidentally, in the embodiment 3, message image projecting devices 990 are provided on the front side of the vehicle 1 and set to be capable of projecting the more front than in the embodiments 1 and 2.

The reference image projecting device 980 is a projecting device for projecting a predetermined reference image. The reference image projecting device 980 is configured of a light source which irradiates light for projection, a display device which generates a reference image to be projected, and a lens for projecting the projected image onto a desired position, etc. Incidentally, when the reference image signal is of a single color, the reference image projecting device 980 requires no display device. In this case, the reference image projecting device 980 may be one which projects light high in directivity onto a desired position. Further, the reference image projecting device 980 may have a movable part for changing a projection area for the reference image in order to control the projection area for the reference image to be projected.

Figure 21:
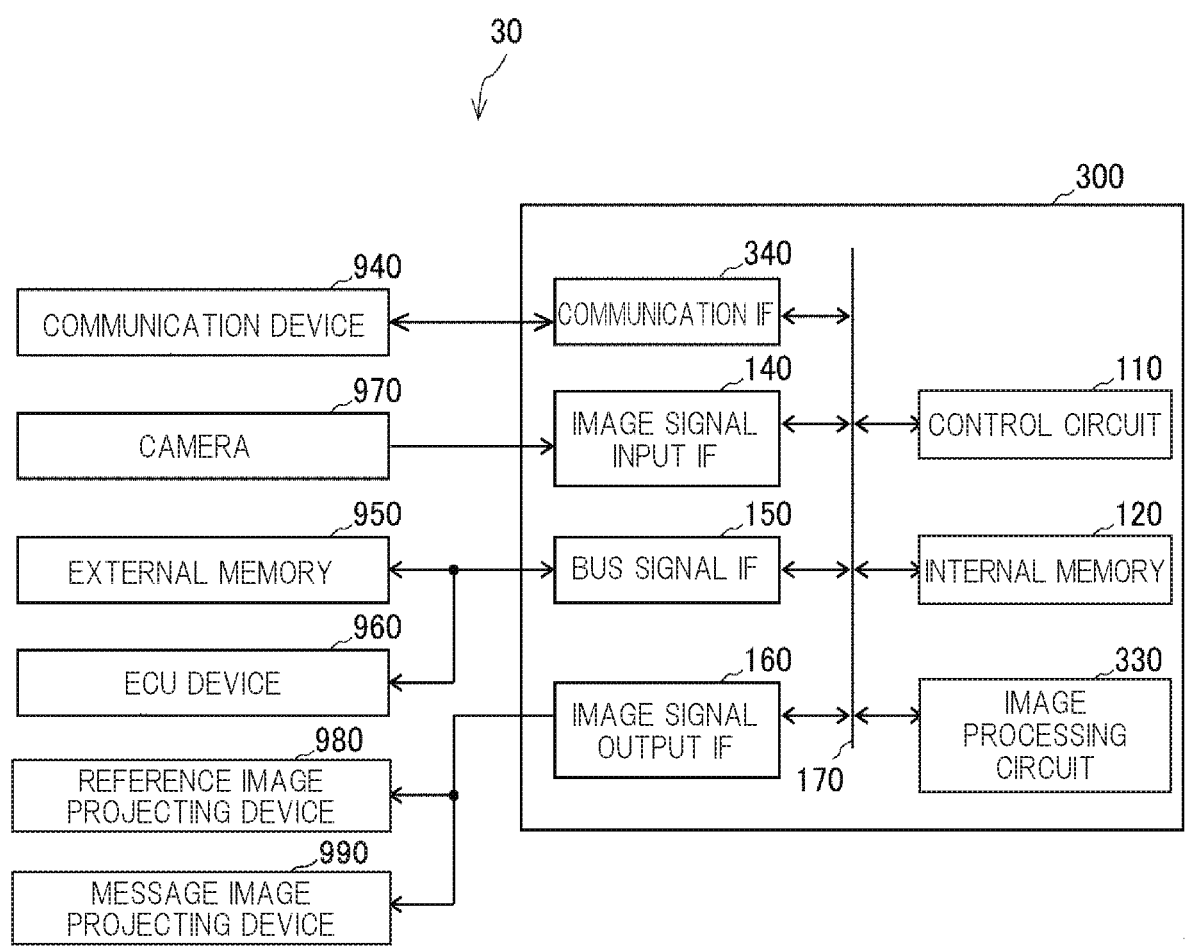
FIG. 21 is a hardware configuration diagram of the message image projecting system according to the embodiment 3.

FIG. 21 is a hardware configuration diagram of the message image projecting system according to the embodiment 3. The message image projecting system 30 according to the embodiment 3 is mainly different from the embodiment 2 in that it has a semiconductor device 300 instead of the semiconductor device 200 and further has a communication device 940.

The semiconductor device 300 is different from the semiconductor device 200 in the embodiment 2 in that it has a communication IF 340. The communication IF 340 is an interface which connects to a bus 170 in the semiconductor device 300 and connects to the communication device 940 outside the semiconductor device 300. The semiconductor device 300 performs transmission and reception of signals to and from the communication device 940 through the communication IF 340. Further, the semiconductor device 300 has an image processing circuit 330 instead of the image processing circuit 230. The image processing circuit 330 will be described later.

The communication device 940 is a communication device which performs wireless communications by using radio waves, infrared rays, or light or the like. The communication device 940 communicates directly or indirectly with its peripheral communication devices. The communication device 940 is coupled to the semiconductor device 300.

The reference image projecting device 980 is coupled to the image signal output IF 160 of the semiconductor device 300. The reference image projecting device 980 receives a reference image signal from the image signal output IF 160 and projects a reference image corresponding to the received reference image signal.

Figure 22:
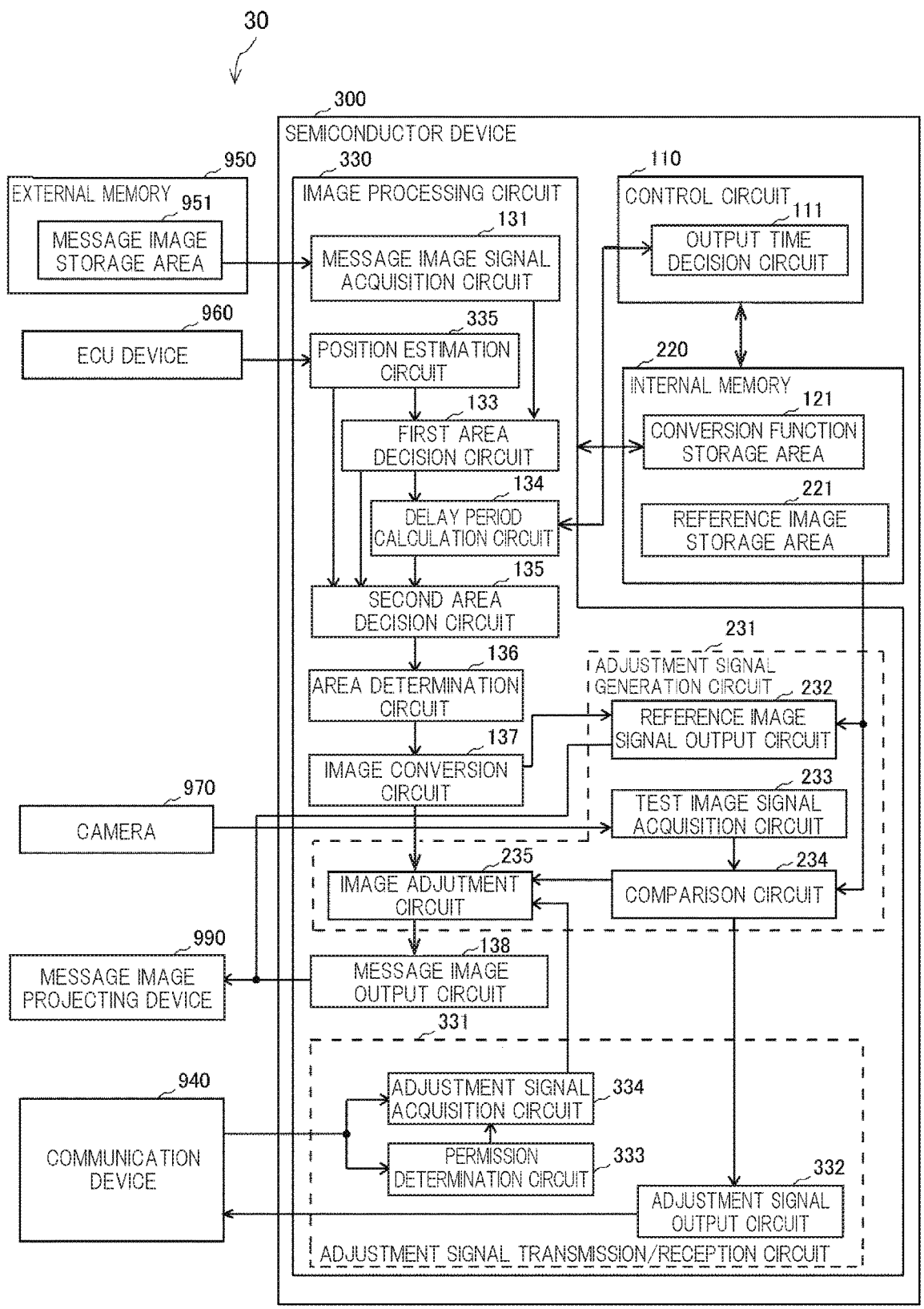
FIG. 22 is a functional block diagram of the message image projecting system 30 according to the embodiment 3.

A description will next be made as to the function of the message image projecting system 30 according to the embodiment 3 with reference to FIG. 22. FIG. 22 is a functional block diagram of the message image projecting system 30 according to the embodiment 3. The semiconductor device 300 included in the message image projecting system 30 has an image processing circuit 330 instead of the image processing circuit 230. The image processing circuit 330 has a position estimation circuit 335 instead of the movement information acquisition circuit 132. Further, the image processing circuit 330 has an adjustment signal transmission/reception circuit 331. The adjustment signal transmission/reception circuit 331 has an adjustment signal output circuit 332, a permission determination circuit 333, and an adjustment signal acquisition circuit 334.

The position estimation circuit 335 is different from the movement information acquisition circuit 132 according to the embodiment 2 in that it acquires movement information of the receiver in addition to the movement information of the self-vehicle. That is, the position estimation circuit 335 generates movement information on the basis of a change in relative positional relationship between a self-vehicle as the transmitter and the receiver. Information about a change in the position of the receiver can be acquired by a range sensor (not shown). The position estimation circuit 335 supplies the generated movement information to a first area decision circuit 133 and a second area decision circuit 135 respectively.

The adjustment signal output circuit 332 bears a function of receiving information about the result of comparison from the comparison circuit 234 and supplying the received information to the communication device 940. Thus, the message image projecting system 30 transmits a result of comparison between a test image signal received from a camera 970 and a reference image signal to the other party.

The permission determination circuit 333 bears a function of determining whether the permission of coupling from the other party is conducted through the communication device 940. The permission determination circuit 333 supplies a signal about a determination result to the adjustment signal acquisition circuit 334. The adjustment signal acquisition circuit 334 receives via the communication device 940, an adjustment signal corresponding to a message image signal from the other party. The adjustment signal acquisition circuit 334 supplies the received adjustment signal to the image adjustment circuit 235.

Figure 23:
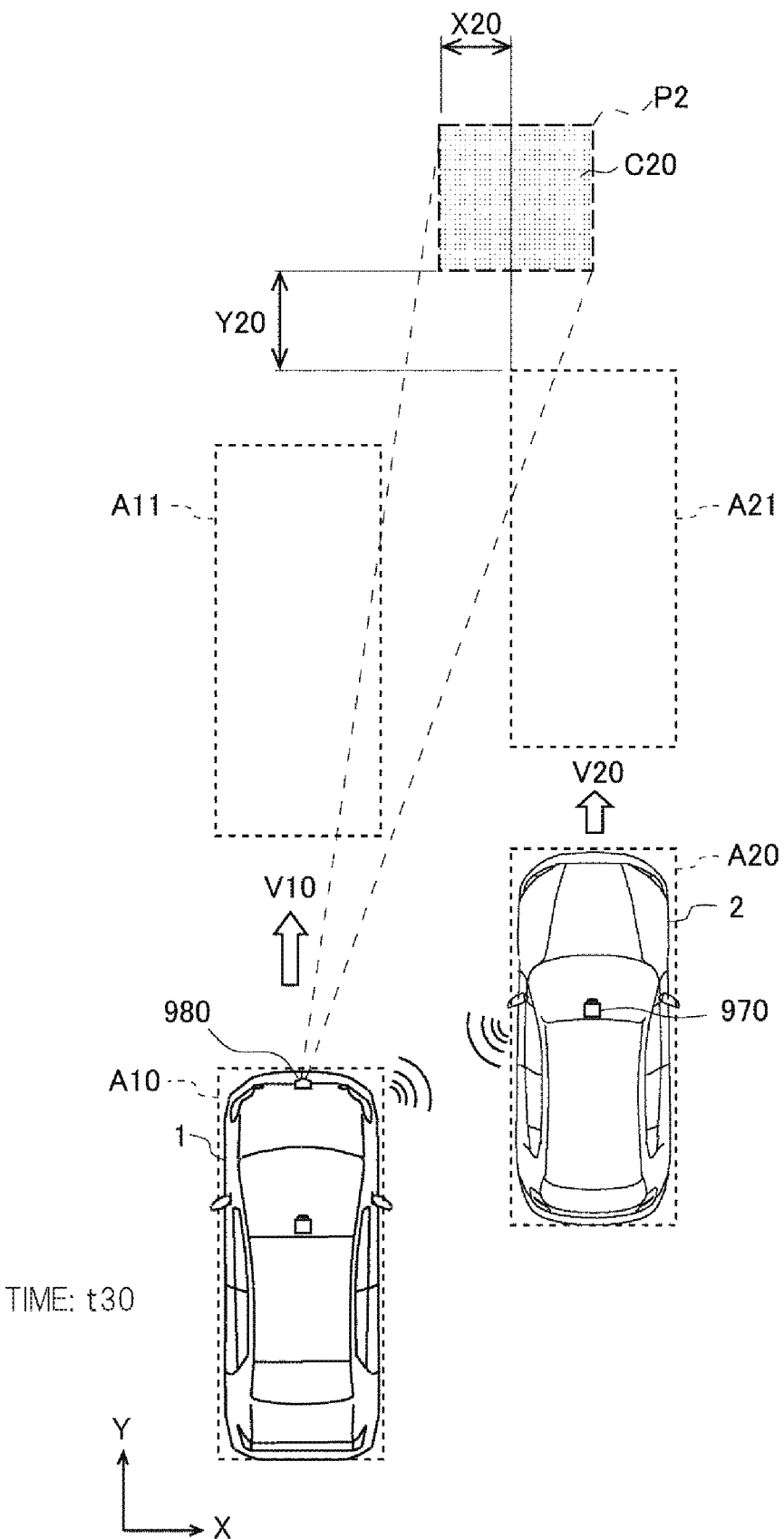
FIG. 23 is a diagram for describing a concrete example of the message image projecting system according to the embodiment 3.

Specific examples will next be described with reference to FIGS. 23 and 24. FIG. 23 is a diagram for describing a specific example of the message image projecting system according to the embodiment 3. FIG. 23 shows a vehicle 1 and a vehicle 2 at a time t30. At the time t30, the vehicle 1 is located at a position A10, and the vehicle 2 is located at a position A20. Further, the vehicle 1 is scheduled to program a message image at a time t31. At the time t31, the vehicle 1 is estimated to be located at a position A11. Further, at the time t31, the vehicle 2 is estimated to be located at a position A21.

The vehicle 1 is located at the position A10 and tries to represent a message image for the vehicle 2 as the transmitter. The reference image projecting device 980 of the vehicle 1 therefore projects a reference image C20 onto a position P2. A relative position between the position P2 and the vehicle 2 is given as a distance X20 in an X-axis direction and given as a distance Y20 in a Y-axis direction at the time t31. Further, the vehicle 2 is located at a position A20 and observes a message image to be displayed by the vehicle 1 as the receiver. That is, the vehicle 2 captures the reference image C20 at the position P2 through the camera 970 at the time t30. The vehicle 2 generates an adjustment signal on the basis of a test image signal obtained by imaging the position P2. Then, the vehicle 2 transmits the generated adjustment signal to the vehicle 1.

A description will next be made as to the specific example with reference to FIG. 24. FIG. 24 is a diagram for describing a specific example of the message image projecting system according to the embodiment 3. FIG. 24 shows a vehicle 1 and a vehicle 2 at a time t31. At the time t31, the vehicle 1 is located at a position A11, and the vehicle 2 is located at a position A21. Further, the vehicle 1 projects a message image C21 onto a position P2.

At the time t31, the vehicle 1 projects the message image C21 onto the position P2 and projects a reference image C20 onto a position P3. The vehicle 2 captures the reference image C20 at the position P3. The vehicle 2 generates an adjustment signal on the basis of a test image signal obtained by imaging the position P3. Then, the vehicle 2 transmits the generated adjustment signal to the vehicle 1.

Thus, the vehicle 1 projects the reference image, and the vehicle 2 captures the reference image. Then, the vehicle 2 generates an adjustment signal on the basis of the test image signal and transmits the generated adjustment signal to the vehicle 1. The vehicle 1 projects the message image adjusted in brightness value on the basis of the received adjustment signal. The message image projected by the vehicle 1 is set in such a manner that a relative positional relation with the vehicle 2 is kept constant.

By repeating the above-described operation, the message image is displayed at the position stable for the driver or the like riding on the vehicle 2 and suppressed in its deterioration.

Figure 25:
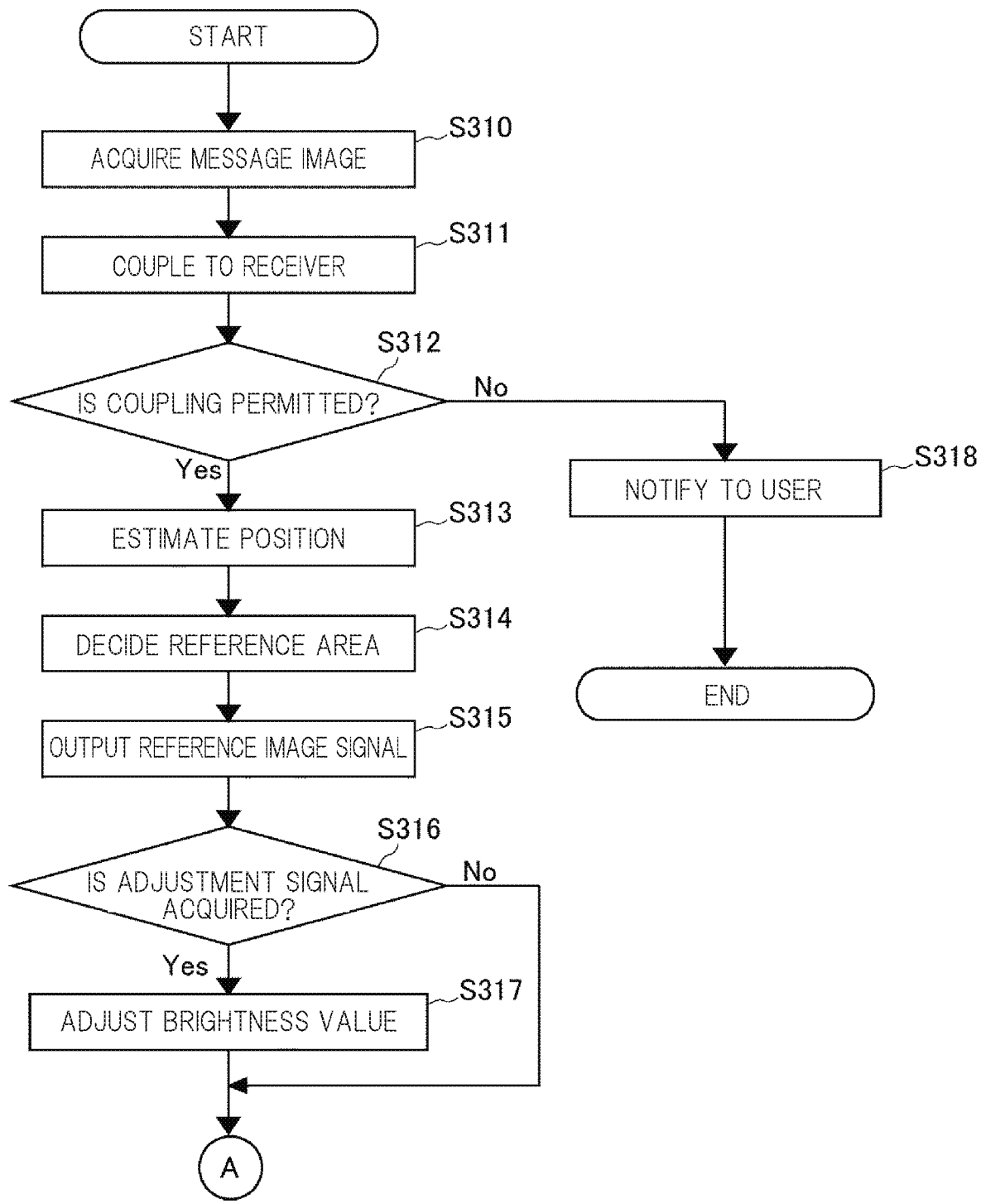
FIG. 25 is a flowchart showing processing on the transmission side of the message image projecting system according to the embodiment 3.

A description will next be made as to the processing of the message image projecting system 30. FIG. 25 is a flowchart showing the processing on the transmission side of the message image projecting system according to the embodiment 3. The flowchart shown in FIG. 25 shows processing of the semiconductor device 300 on the transmission side in the present embodiment.

The semiconductor device 300 acquires a message image from a message image storage area 951 (Step S310). Next, the semiconductor device 300 performs coupling to the receiver of the message image (Step S311). The semiconductor device 300 determines whether the permission of coupling is received from the receiver (Step S312). When it is not determined that the coupling permission has been received from the receiver (Step S312: No), the semiconductor device 300 notifies non-reception of the coupling permission to a user and completes the processing.

On the other hand, when it is determined that the coupling permission has been received from the receiver (Step S312: Yes), the semiconductor device 300 estimates a self-vehicle position and the position of the receiver (Step S313). Then, the semiconductor device 300 decides a reference area being an area to project a reference image on the basis of the estimated positions (Step S314). Next, the semiconductor device 300 outputs a reference image signal to the reference image projecting device 980 in order to project a reference image onto the decided reference area (Step S315). The reference image projecting device 980 having received the reference image signal therein projects the reference image onto the decided reference area. In the case of the example shown in FIG. 23, the vehicle 1 projects the reference image C20 onto the position P2 being the reference area.

Next, the semiconductor device 300 determines whether an adjustment signal is acquired from the receiver after the reference image signal is projected (Step S316). When the adjustment signal is not acquired from the receiver within a preset time, the semiconductor device 300 does not determine that the adjustment signal has been acquired (Step S316: No). In this case, the semiconductor device 300 is not capable of adjusting a message image signal. The semiconductor device 300 therefore proceeds to the next Step (coupling part A) without adjusting the brightness value.

On the other hand, when the adjustment signal is acquired, the semiconductor device 300 determines that the adjustment signal has been acquired (Step S316: Yes). In this case, the semiconductor device 300 adjusts the brightness value of the message image signal on the basis of the adjustment signal acquired from the receiver (Step S317). Then, the semiconductor device 300 proceeds to the next Step (coupling part A) to output the adjusted message image signal.

Figure 26:
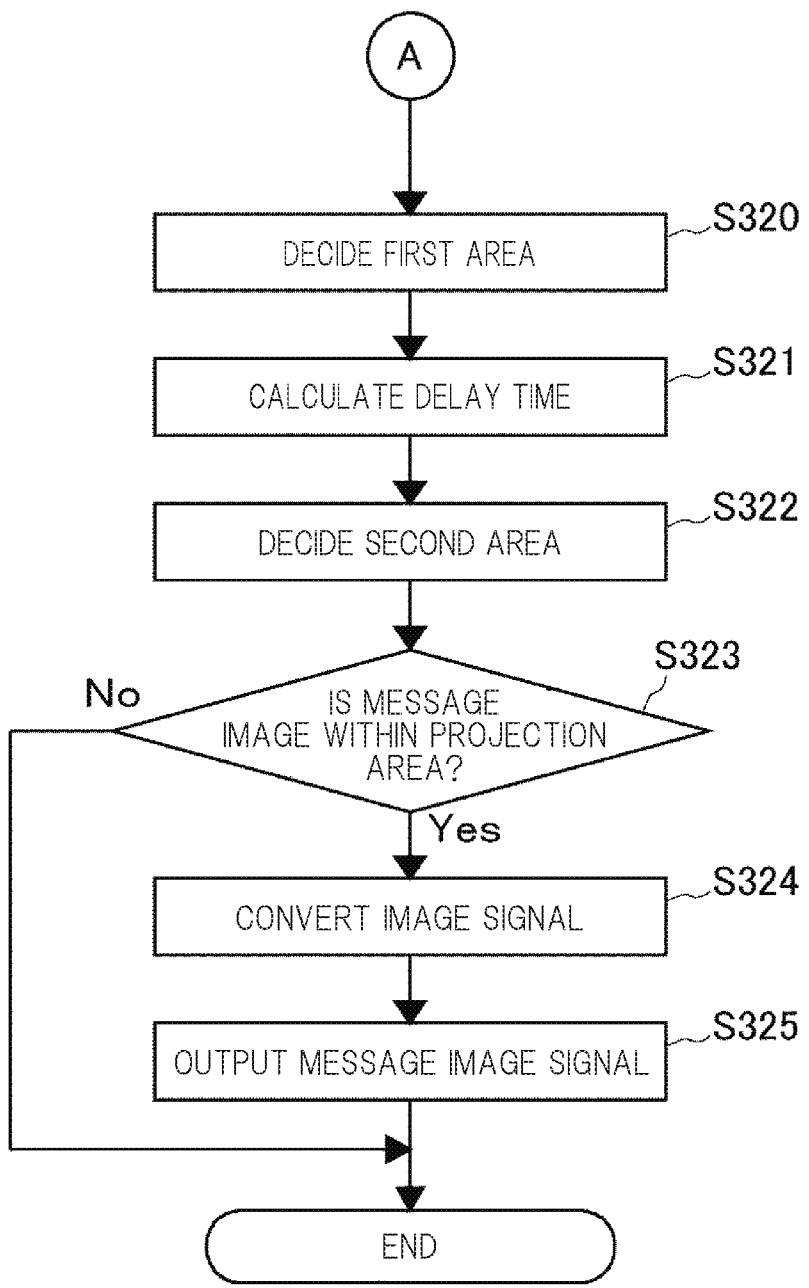
FIG. 26 is a flowchart showing processing on the transmission side of the message image projecting system according to the embodiment 3.

Subsequently, a description will be made as to the processing after the coupling part A with reference to FIG. 26. FIG. 26 is a flowchart showing the processing on the transmission side of the message image projecting system according to the embodiment 3. The semiconductor device 300 decides a first area on the basis of the movement information of the vehicle 1 (Step S320).

Then, the semiconductor device 300 calculates a delay period on the basis of the movement information of the vehicle 1 and information about the first area (Step S321). Next, the semiconductor device 300 decides a second area on the basis of the movement information of the vehicle 1, the information about the first area, and the information about the delay period (Step S322).

Next, the semiconductor device 300 determines whether the second area is within the projection area (Step S323). When it is determined that the second area is within the projection area (Step S323: Yes), the semiconductor device 300 performs image signal conversion processing (Step S324). Next, the semiconductor device 300 outputs the message image signal received from the image conversion circuit 137 (Step S325). When the semiconductor device 300 outputs the message image signal, the semiconductor device 300 completes the processing. On the other hand, when it is not determined in Step S323 that the second area is within the projection area (Step S323: No), the semiconductor device 300 completes the processing.

Figure 27:
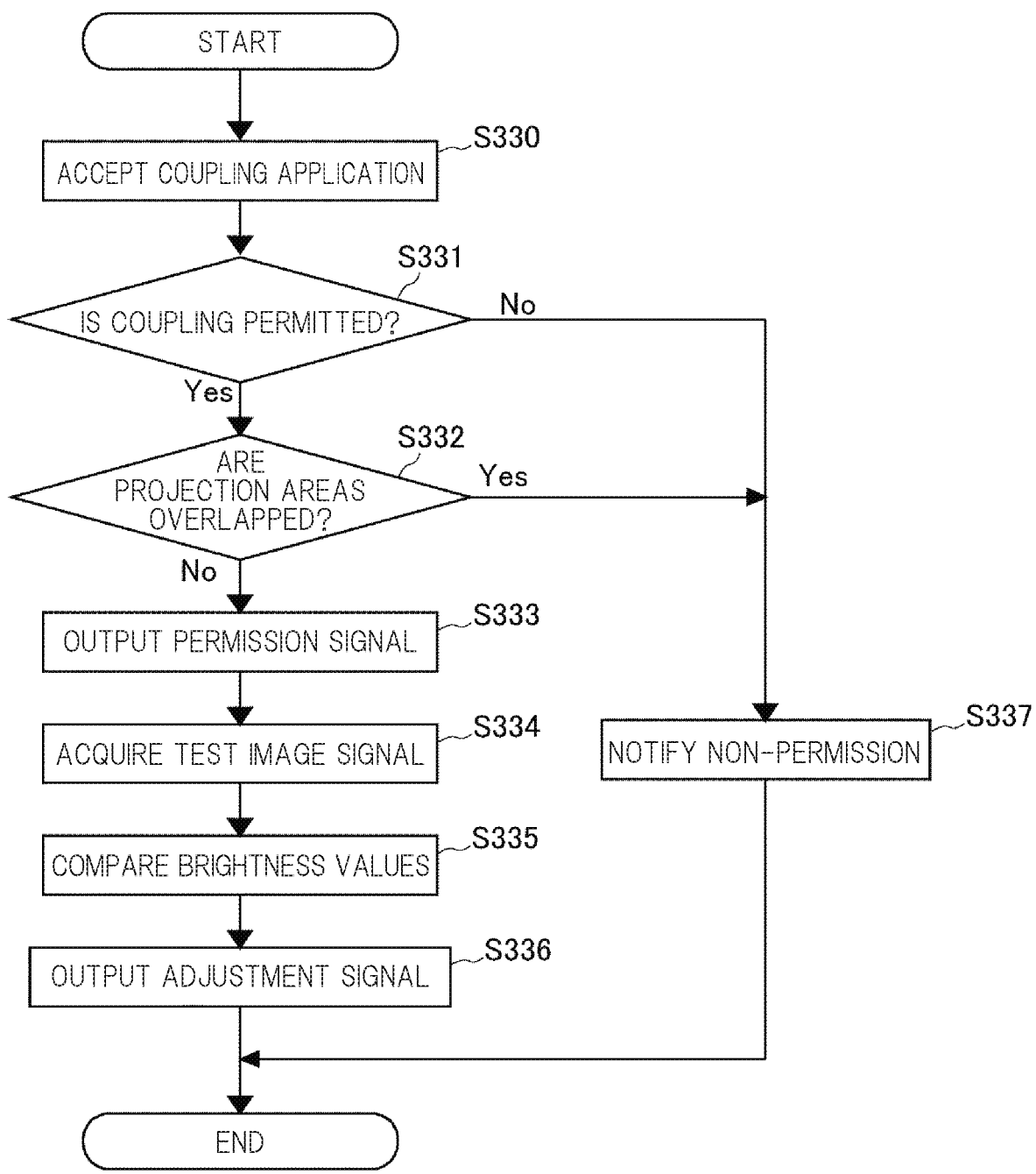
FIG. 27 is a flowchart showing processing on the reception side of the message image projecting system according to the embodiment 3.

A description will next be made as to the processing on the reception side with reference to FIG. 27. FIG. 27 is a flowchart showing the processing on the reception side of the message image projecting system according to the embodiment 3.

First, the semiconductor device 300 accepts a coupling application from the transmitter (Step S330). A signal for the coupling application includes a signal concerning an area intended to be projected by the transmitter. Next, the semiconductor device 300 determines whether coupling is permitted (Step S331). When the coupling is not permitted due to reasons such as when the transmitter being already in communication with the other party, etc., the semiconductor device 300 does not determine the coupling permission (Step S331: No). In this case, the semiconductor device 300 transmits a notification of a coupling non-permission to the opposite party having accepted the application (Step S337) and completes a series of processing.

On the other hand, when it is determined that the coupling is permitted (Step S331: Yes), the semiconductor device 300 determines whether projection areas overlap (Step S332). For example, in FIG. 24, the vehicle 1 is projecting a message image C21 onto a position P2. In such a case, it is not allowable for the other party to further project a message image onto the area overlapped with the position P2. Thus, when it is determined that the area intended to be projected by the opposite party that applies for the coupling overlaps with a message image projection area of the other party (Step S332: Yes), the semiconductor device 300 transmits a notification of a coupling non-permission to the opposite party having accepted the application (Step S337) and completes a series of processing.

On the other hand, when it is not determined that the area overlaps with the message image projection area of the other party (Step S332: No), the semiconductor device 300 outputs a permission signal (Step S333). Then, the receiver captures a reference image projected by the transmitter through the camera 970 of the receiver. The semiconductor device 300 acquires a test image signal generated by the camera 970 (Step S334). Next, the semiconductor device 300 receives a reference image signal from the reference image storage area 221 and compares a brightness value of the received reference image signal with a brightness value of the acquired test image signal (Step S335). Next, the semiconductor device 300 generates an adjustment signal on the basis of the result of its comparison and outputs the generated adjustment signal to the communication device 940 (Step S336). Then, the semiconductor device 300 completes a series of processing.

Figure 24:
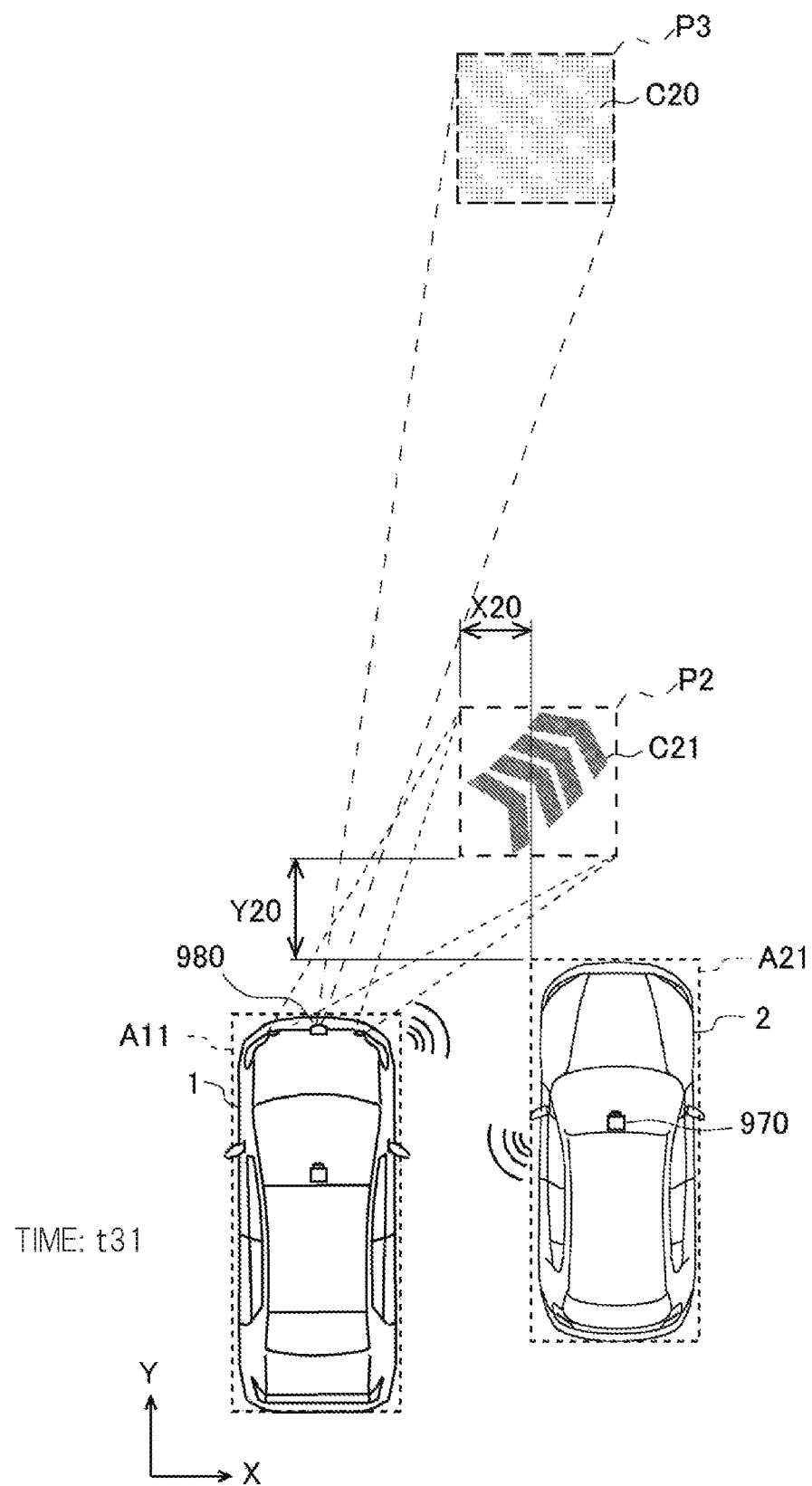
FIG. 24 is a diagram for describing a concrete example of the message image projecting system according to the embodiment 3.

FIG. 24 is a state in which after the vehicle 2 having the semiconductor device 300 has completed the series of processing shown in FIG. 27, the message image is projected from the vehicle 1. By executing such processing, the message image projecting system 30 is capable of projecting the message image which does not interfere with the receiver and suppresses degradation in visibility, onto the position stable for the receiver.

Modification of Embodiment 3

Figure 28:
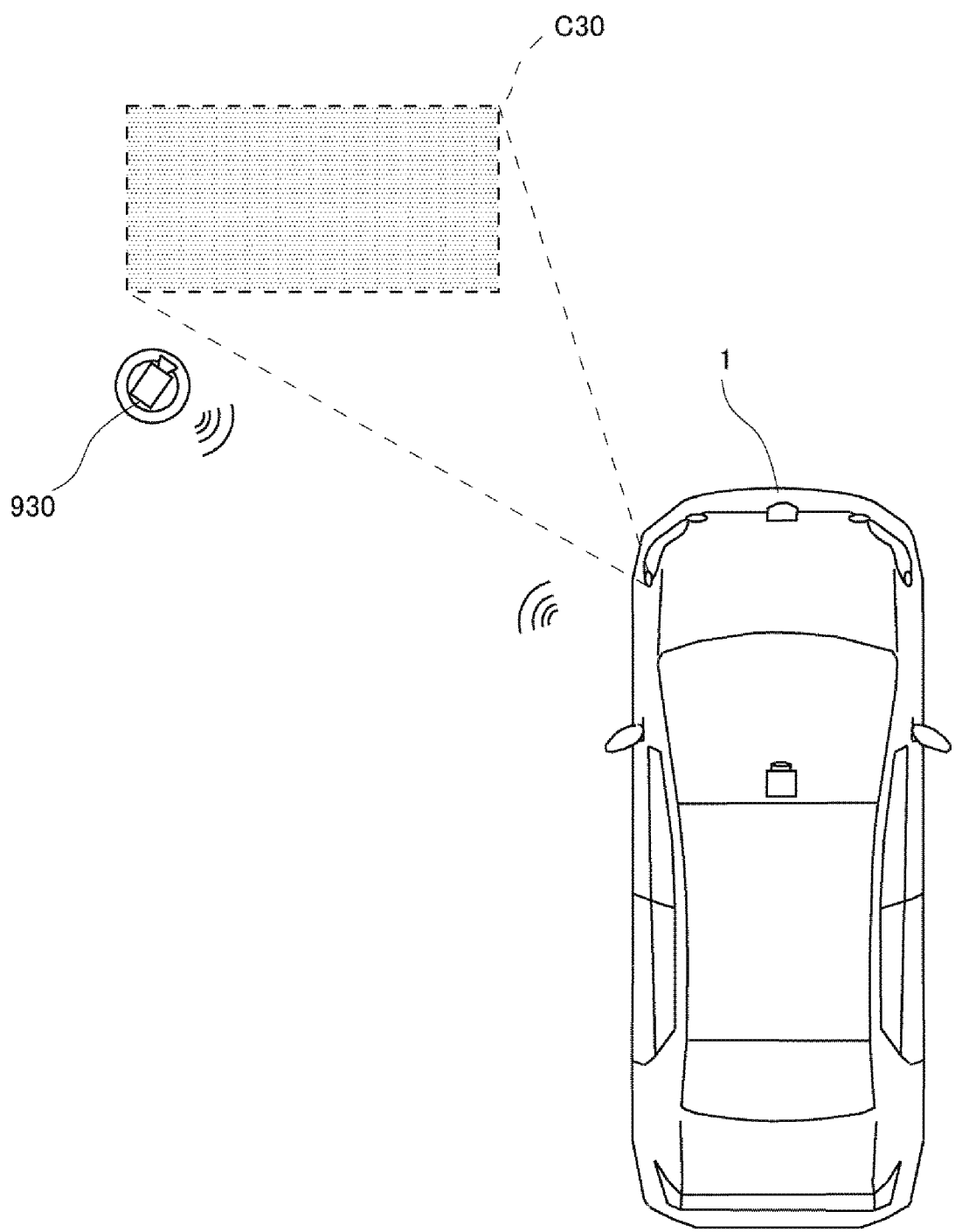
FIG. 28 is a diagram showing a modification of the embodiment 3.

In the message image projecting system 30 according to the embodiment 3, the receiver may be, for example, a robot 930 other than the vehicle. FIG. 28 is a diagram showing a modification of the embodiment 3. The robot 930 has a camera and a communication device and captures an image C30 projected by a vehicle 1. With such a configuration, the message image projecting system 30 is capable of projecting a message image suppressing degradation in visibility for the robot 930 onto a stable position for the robot 930. Further, the message image projecting system 30 is capable of projecting a message image suppressing degradation in visibility even with respect to a user that monitors scenes like town streets or the like or undergoes a pseudo experience through the robot 930. Incidentally, the robot 930 may be movable or may be one not moved.

Although the invention made above by the present inventors has been described specifically on the basis of the preferred embodiments, the present invention is not limited to the embodiments referred to above. It is needless to say that various changes can be made thereto within the scope not departing from the gist thereof. For example, although the embodiments have been described by taking the vehicle for example, a bicycle, a bike, a robot, a hovercraft, etc. may be adopted as long as they are mobiles each moved along a moving surface.

Some or all of the above embodiments can be also described as in the following appendices, but are not limited to the following.

APPENDIX 1

A semiconductor device which outputs a message image signal being a signal of a message image projected onto a periphery of a mobile, including:

a memory which stores therein a conversion function set in advance, a processor which decides a first area onto which the message image is projected, on the basis of movement information of the mobile, calculates a delay period being a period from a first time when the message image is projected onto the first area to a second time when the message image is projectable, adjusts the first area on the basis of the delay time to decide a second area, converts the message image signal according to the second area, and outputs the converted message image signal, and an interface for outputting the message image signal.

APPENDIX 2

A projecting system including a semiconductor device and a projecting device which is mounted in the mobile and projects the message image output from the semiconductor device, in which the semiconductor device is a semiconductor device which outputs a message image signal being a signal of a message image to be projected onto a periphery of the mobile, and includes a first area decision part which decides based on movement information of the mobile, a first time being a schedule time when the message image is to be projected, and a first area being an area onto which the message image is projected, respectively, a delay period calculation part which calculates a delay period being a period from the first time when the message image is projected onto the first area to a second time when the message image is projectable, a second area decision part which adjusts the first area on the basis of the delay period to decide a second area, an image signal conversion part which converts the message image signal according to the second area, and a message image output part which outputs the converted message image signal.

What is claimed is:

1. A semiconductor device which outputs a message image signal being a signal of a message image to be projected onto a periphery of a mobile, the semiconductor device comprising:

a first area decision part which decides based on movement information of the mobile, a first area being an area onto which the message image is projected at a first time being a schedule time when the message image is to be projected;

a delay period calculation part which calculates a delay period being a period from the first time when the message image is projected onto the first area to a second time when the message image is projectable;

a second area decision part which adjusts the first area on the basis of the movement information and the delay period to decide a second area; and an image signal conversion part which converts the message image signal according to the second area.

2. The semiconductor device according to claim 1, further comprising a message image output part which outputs the message image signal converted by the image signal conversion part.

3. The semiconductor device according to claim 1, wherein the first area decision part decides the first area on the basis of the movement information including a moving speed and a steering angle of the mobile.

4. The semiconductor device according to claim 1, wherein the first area decision part decides the first area on the basis of the movement information including an image signal of an image obtained by imaging the periphery of the mobile.

5. The semiconductor device according to claim 1, further including an output time decision part which decides a signal output time being a time when a message image signal is output, wherein the message image output part outputs the message image signal according to the signal output time.

6. The semiconductor device according to claim 4, wherein the delay period calculation part sets the second time on the basis of the signal output time.

7. The semiconductor device according to claim 5, wherein the delay period calculation part adds a preset additive period to the signal output time to decide the second time.

8. The semiconductor device according to claim 1, wherein the first area decision part decides the first area in a range exceeding a projectable area being an area capable of projecting the message image thereon.

9. The semiconductor device according to claim 1, further including an area determination part, wherein when the second area is not included in the projectable area, the area determination part stops processing of outputting the message image signal.

10. The semiconductor device according to claim 1, wherein the image signal conversion part has a conversion function of deciding a degree of distortion of an image according to the projection area.

11. The semiconductor device according to claim 9, wherein the image signal conversion part has a conversion function of trapezoid-converting an image.

12. The semiconductor device according to claim 1, further including:

a reference image signal output part which outputs a reference image signal being a signal of a reference image corresponding to the projection area being the area onto which the message image is projected;

a test image signal acquisition part which acquires a test image signal being a signal of a test signal obtained by imaging the projection area onto which the reference image is projected;

a comparison part which compares the reference image signal with the test image signal; and an image adjustment part which adjusts the message image signal on the basis of the result of comparison therebetween, wherein the message image output part outputs the message image signal converted by the image signal conversion part and adjusted by the image adjustment part.

13. The semiconductor device according to claim 11, wherein the reference image signal output part outputs a reference image signal converted by the image signal conversion part.

14. The semiconductor device according to claim 11, wherein the image adjustment part adjusts a pixel value included in the message image signal.

15. The semiconductor device according to claim 11, wherein the reference image signal output part outputs the reference image signal in which brightness values of red, green and blue are equal to each other.

16. The semiconductor device according to claim 11, further including an adjustment signal acquisition part which acquires an adjustment signal corresponding to the reference image projected by the mobile from a target positioned around the mobile, wherein the image adjustment part adjusts a message image on the basis of the adjustment signal acquired from the target.

17. The semiconductor device according to claim 15, further including a permission determination part which determines whether the target allows projection of the reference image.

18. The semiconductor device according to claim 15, further including a position estimation part, wherein the position estimation part calculates an estimation position being a relative position of the mobile and the target at a schedule time when the message image is to be projected, on the basis of the movement information of the mobile and movement information of the target, and wherein the first area decision part decides the first area on the basis of the estimation position.

19. The semiconductor device according to claim 11, further including an adjustment signal output part, wherein the test image signal acquisition part acquires a sample image signal being a signal of an image obtained by capturing a sample image projected by a projecting device moved around the mobile, wherein the comparison part compares the reference image signal with the sample image signal, and wherein the adjustment signal output part outputs an adjustment signal for adjusting the sample image signal on the basis of a result of comparison between the reference image signal and the sample image signal.

20. A message image signal output method of outputting a message image signal being a signal of a message image to be projected onto a periphery of a mobile, the method comprising:

deciding based on movement information of the mobile, a first time being a schedule time when the message image is to be projected, and a first area being an area onto which the message image is projected, respectively;

calculating a delay period being a period from the first time when the message image is projected onto the first area to a second time when the message image is projectable;

adjusting the first area on the basis of the movement information and the delay period to decide a second area; and converting the message image signal according to the second area.

* * * * *